(12) United States Patent
Prechtl et al.

(10) Patent No.: US 6,699,405 B2
(45) Date of Patent: Mar. 2, 2004

(54) POLYMERIZABLE LIQUID CRYSTALS

(75) Inventors: Frank Prechtl, Frankfurt (DE); Robert Parker, Mannheim (DE); Peter Schuhmacher, Mannheim (DE); Norbert Schneider, Altrip (DE); Sylke Haremza, Neckargemünd (DE); Hans-Werner Schmidt, Bayreuth (DE); Gerold Schmitt, Bayreuth (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/824,022

(22) Filed: Apr. 3, 2001

(65) Prior Publication Data

US 2002/0036285 A1 Mar. 28, 2002

(30) Foreign Application Priority Data

Apr. 3, 2000 (DE) .......................... 100 16 524

(51) Int. Cl.[7] .............................................. C09K 19/20
(52) U.S. Cl. ............................ 252/299.64; 252/299.65; 252/299.6; 252/299.66; 252/299.67; 252/299.68; 428/1.1
(58) Field of Search ................... 428/1.1; 252/299.01, 252/299.5, 299.6, 299.61, 299.62, 299.63, 299.64, 299.65, 299.67, 299.68

(56) References Cited

U.S. PATENT DOCUMENTS 6,395,351 B1 * 5/2002 Benecke et al. ............. 428/1.1

FOREIGN PATENT DOCUMENTS

| EP | 0 601 483 | 6/1994 |
|----|-----------|--------|
| WO | WO 97/27252 | 7/1997 |
| WO | WO 99/11733 | 3/1999 |

* cited by examiner

*Primary Examiner*—Mark F. Huff
*Assistant Examiner*—Jennifer R. Sadula
(74) *Attorney, Agent, or Firm*—Oblon, Spivak, McClelland, Maier & Neustadt, P.C.

(57) ABSTRACT

Disclosed are polymerizable liquid-crystalline compounds of the general formula (I)

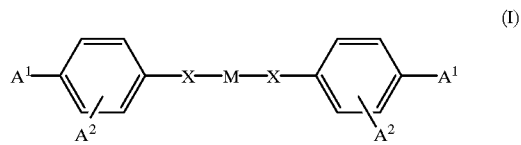

where $A^1$ and $A^2$ are identical or different and are each a crosslinkable group; the radicals X are identical or different and are each a single bond, —O—, —S—, —C=N—, —O—CO—, —CO—O—, —O—CO—O—, —CO—NR—, —NR—CO—, —NR—, —O—CO—NR—, —NR—CO—O—, —CH$_2$—O— or —NR—CO—NR, in which R is H or $C_1$–$C_4$-alkyl; and M is a mesogenic group, a process for their preparation and their use for preparing cholesteric phases.

19 Claims, No Drawings

POLYMERIZABLE LIQUID CRYSTALS

The present invention relates to novel polymerizable liquid-crystalline compounds, to a process for their preparation, to compositions comprising these compounds, and to coating compositions and pigments based on these compounds for various applications.

Aligned, low molecular weight liquid crystals can be permanently fixed by UV polymerization, since UV polymerization is so fast that relaxation of the aligned liquid crystals is not possible. When crosslinkable cholesteric liquid crystals or crosslinkable mixtures of nematic liquid crystals and chiral dopants are used, UV polymerization leads to cholesteric networks exhibiting the characteristic optical properties of a cholesteric mesophase. It is of particular importance that the formation of such networks stabilizes the color flop effect, i.e. the property of a cholesteric liquid crystal to appear in a different color depending on the viewing angle. This significantly simplifies the preparation of cholesteric special-effect or color flop pigments.

Cholesteric pigments are platelet-shaped particles exhibiting shape anisotropy which are prepared from the photocrosslinkable, cholesteric starting mixture via a plurality of process steps. Said starting mixture has to be converted, in its mesophase, into an aligned film and fixed by subsequent UV polymerization. At the same time, this step determines the thickness of the platelet-shaped particles. The resulting cholesteric network then has to be ground to pigment particles in another process step.

Cholesteric color flop pigments of various compositions are already known. Siloxane-based color flop pigments are described, for example, in EP-A-0 601 483. Said pigments were prepared by crosslinking cyclic siloxanes having both chiral and mesogenic side groups via acrylate or methacrylate groups on the mesogenic side groups and processing to pigments.

WO-A-97/27252 describes color flop pigments obtainable by polymerizing mixtures comprising a chiral liquid-crystalline polymerizable monomer, an achiral liquid-crystalline polymerizable monomer and a chiral compound, and a polymeric binder and/or a monomeric, polymerizable compound and/or a dispersion auxiliary. WO-A-99/11733 describes an improved process for preparing color flop pigments and numerous different types of crosslinkable cholesteric mixtures. Suitable achiral liquid-crystalline polymerizable monomers have the general formula

Z—Y—A—Y—M—Y—A—Y—Z where M is a mesogenic group, A is a spacer group, Y is one of various bridging groups and Z is a polymerizable end group. Preferred radicals Z are acrylate radicals. Each monomer preferably has two polymerizable groups Z.

EP-A-0 675 186 describes photocrosslinkable liquid crystals comprising four crosslinkable groups per molecule. The compounds have the following general formula

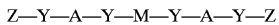
B
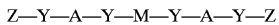

where the mesogen is a linear trinuclear group, B is a bridge linking the two mesogens and each R is a crosslinkable radical. The mesogen preferably comprises three bridged p-phenylene groups, and the crosslinkable radicals R are in each case terminal in p position. Said compounds are used for preparing optical components. Their suitability for preparing crosslinked cholesteric special-effect pigments was not investigated. Said compounds have the disadvantage that the crosslinking density per mesogen unit which can be achieved is low.

It is an object of the present invention to provide improved crosslinkable achiral liquid-crystalline monomers, in particular those which make it possible to prepare liquid-crystalline polymers having relatively high crosslinking density.

We have found that, surprisingly, this object is achieved by providing liquid-crystalline compounds of the formula (I)

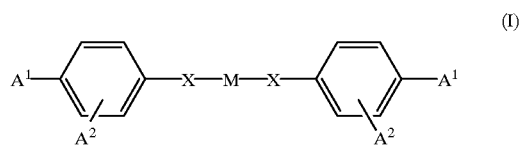

where $A^1$ and $A^2$ are identical or different and are each a crosslinkable group;

the radicals X are identical or different, preferably identical, and are each a single bond, —O—, —S—, —C=N—, —O—CO—, —CO—O—, —O—CO—O—, —CO—NR—, —NR—CO—, —NR—, —O—CO—NR, —NR—CO—O—, —CH$_2$—O— or —NR—CO—NR, in which R is H or $C_1$–$C_4$-alkyl; and M is a mesogenic group.

The compounds of the formula I according to the invention are notable for the fact that they are capable of forming a liquid-crystalline phase and stabilize this phase particularly well and permanently owing to their increased crosslinkable group content.

The present invention preferably provides compounds of the general formula I, where $A^2$ is ortho to $A^1$ at each occurrence.

Preference is likewise given to compounds of the general formula I where $A^1$ and $A^2$ are each, independently of one another, a group of the formula Z—X—(Sp)$_n$— where

Z is a crosslinkable radical;

X is as defined above;

Sp is a spacer having from 1 to 30 carbon atoms, in which the carbon chain may be interrupted by ether oxygen, thioether sulfur or nonadjacent imino or $C_1$–$C_4$-alkylimino groups; and n is 0 or 1.

$A^1$ and $A^2$ are preferably identical.

According to a preferred embodiment Z is selected from:

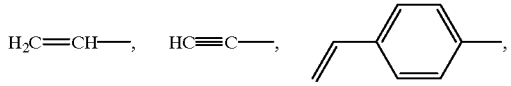

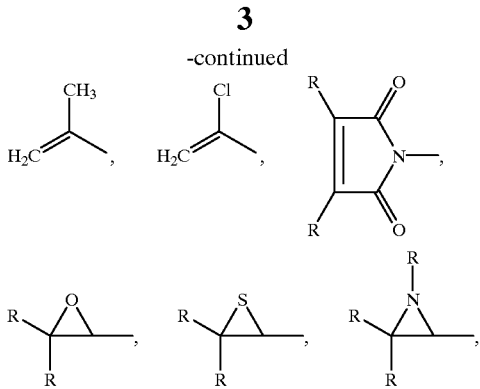

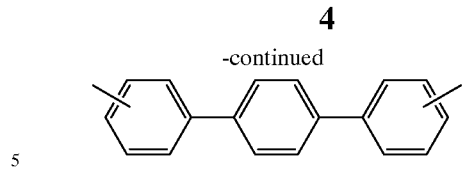

and substituted analogs thereof. Substituted analogs of said bridging groups can carry from 1 to 4 identical or different substituents per aromatic ring, preferably one or two substituents per ring or per bridging group. Suitable substituents are selected from $C_1$–$C_4$-alkyl as defined above, nitro, halogen, such as F, Cl, Br, I, phenyl or $C_1$–$C_4$-alkoxy, the alkyl radical being defined as above.

The present invention likewise provides a process for preparing compounds of the general formula I, which comprises reacting a compound of the formula III

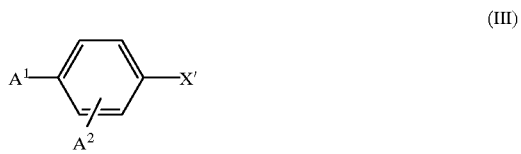 (III)

where the radicals R are each, independently of one another, $C_1$–$C_4$-alkyl, for example methyl, ethyl, n- or i-propyl or n-, i- or t-butyl.

According to another preferred embodiment Sp is selected from:

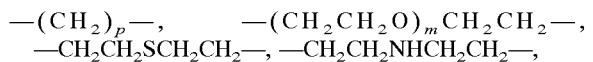

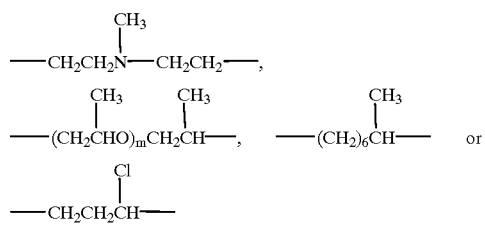

where $A^1$ and $A^2$ are as defined above and X' is a reactive side group, with a mesogen compound of the general formula IV $$X''—M—X'' \qquad (IV)$$

where M is as defined above and X'' is a reactive side group, X' and X'' being selected such that they are capable of forming group X.

The present invention provides in particular a process in which a mesogen of the formula IV where X'' is OH is reacted with a compound of the formula III where X' is —COOH or —COHal, where Hal=F, Cl, Br or I.

The present invention furthermore provides a composition comprising at least one compound of the formula I and, if desired, further components selected from cholesteric, crosslinkable or noncrosslinkable groups, inorganic pigments, colorants, photoinitiators, flow control agents, UV stabilizers, binders and polymerizable or nonpolymerizable diluents or carriers.

Preferred cholesteric compounds are, for example, chiral compounds of the general formulae Xa, b, c and d $$(Z—X^5)_n Ch \quad (Xa), \quad (Z—X^2—Sp—X^5)_n Ch \qquad (Xb),$$

$$(P^1—X^5)_n Ch \quad (Xc) \quad (Z—X^2—Sp—X^3—M—X^4)_n X \qquad (Xd),$$

where

Z is as defined above,

Sp is a spacer as defined above, $X^2$, $X^3$ and $X^4$ are each, independently of one another, a chemical single bond, —O—, —S—, —O—CO—, —CO—O—, —O—CO—O—, —CO—NR—, —NR—CO—, —O—CO—NR—, —NR—CO—O— or —NR—CO—NR, where at least one of the groups $X^3$ and $X^4$ is —O—CO—O—, —O—CO—NR—, —NR—CO—O— or —NR—CO—NR— and R is $C_1$–$C_4$-alkyl;

$X^5$ is as defined for $X^2$, $X^3$ and $X^4$ or is —CH$_2$—O—, —O—CH$_2$—, —CH=N—, —N=CH— or —N≡N—, M is a mesogenic group as defined above, $P^1$ is a radical selected from hydrogen, $C_1$–$C_{30}$-alkyl, $C_1$–$C_{30}$-acyl, $C_3$–$C_8$-cycloalkyl, unsubstituted or subwhere m is from 1 to 3 and p is from 1 to 12.

According to another preferred embodiment M is selected from groups of the general formula II:

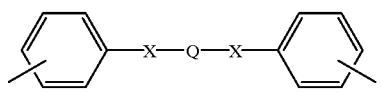 (II)

where

X is as defined above, and

Q is substituted or unsubstituted alkylene, such as linear or branched $C_1$–$C_{12}$-alkylene, or a substituted or unsubstituted aromatic bridging group.

Preferred aromatic bridging groups are selected from

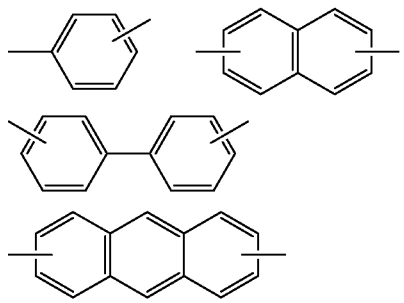

stituted by one to three $C_1$–$C_6$-alkyl, and where the carbon chain of the alkyl, acyl and cycloalkyl radicals may be interrupted by ether oxygen, thioether sulfur or nonadjacent imino or $C_1$–$C_4$-alkylimino groups,
n is a number from 1 to 6 and
Ch is an n-valent chiral radical.
Examples of radicals Ch are
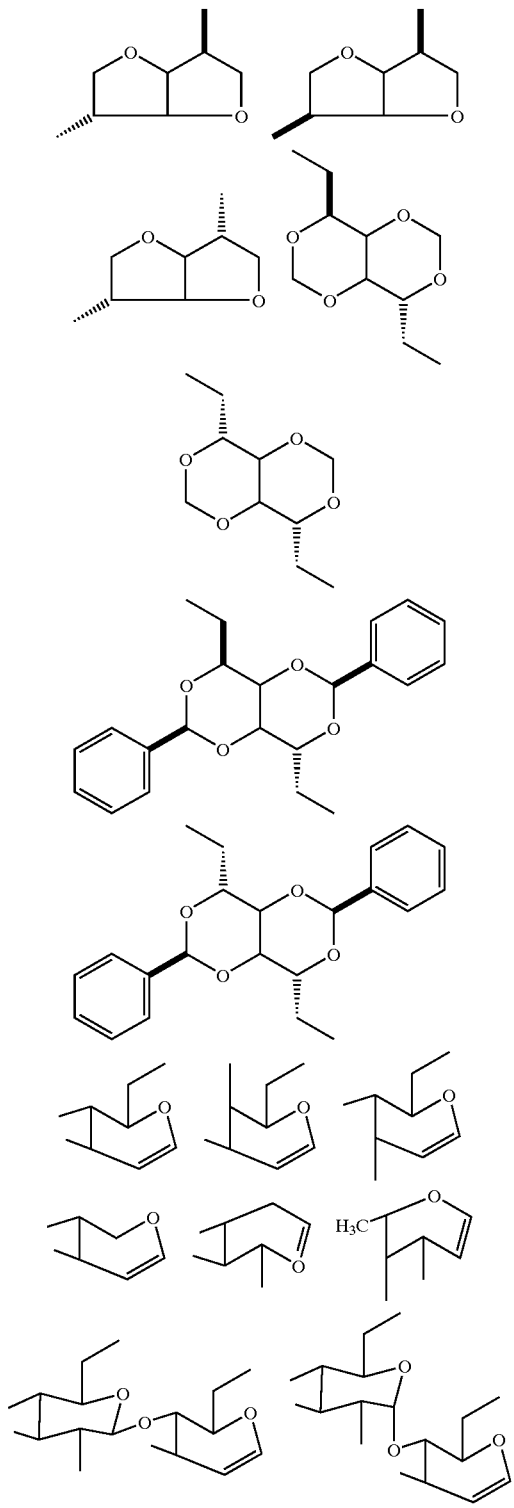
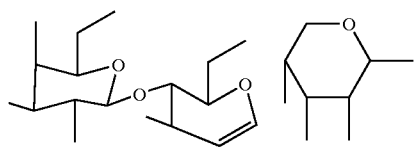
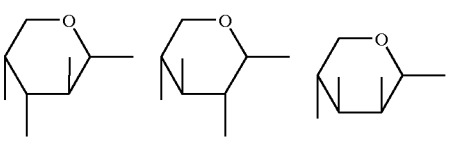
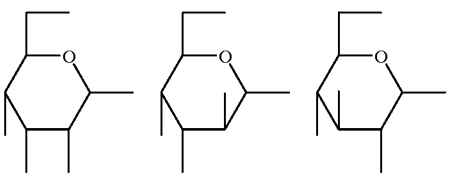
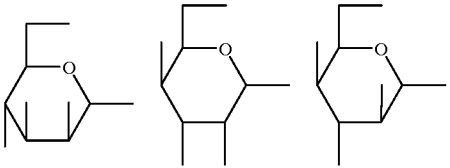
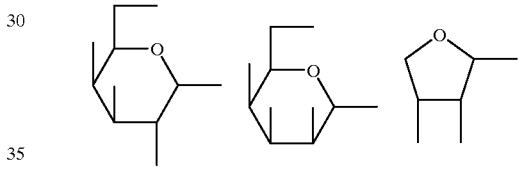

-continued

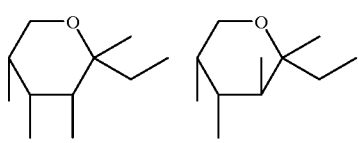
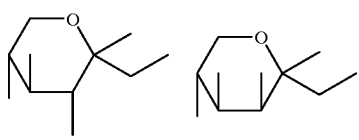
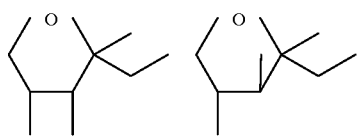
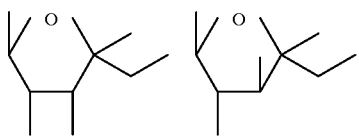
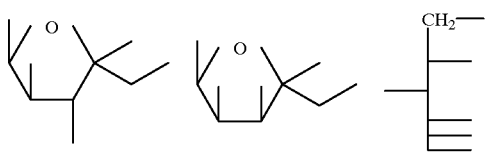
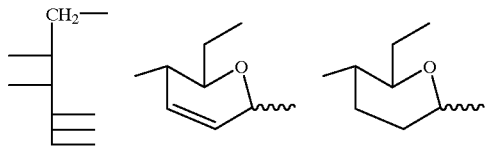
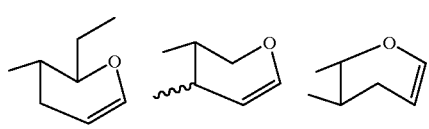
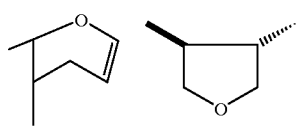
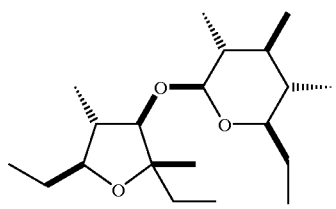

-continued

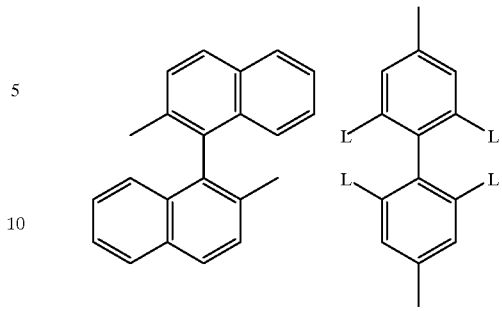

where

L is $C_1$- to $C_4$-alkyl, $C_1$–$C_4$-alkoxy, halogen, COOR, OCOR, CONHR or NHCOR and R is $C_1$–$C_4$-alkyl.

(The terminal dashes in the above formulae indicate the free valencies)

Particular preference is given, for example, to the following:

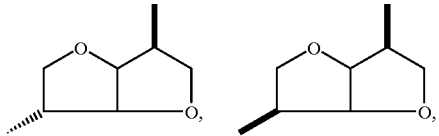
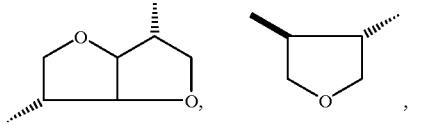
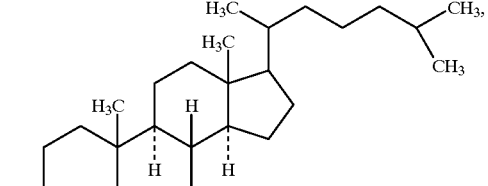

or

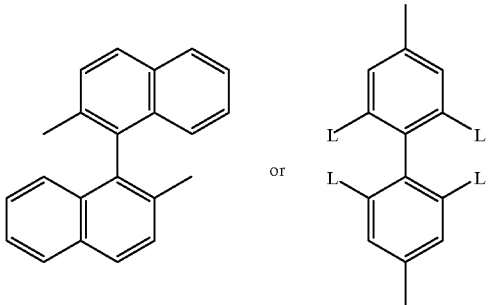

These and other preferred chiral components are mentioned, for example, in DE-A 43 42 280 and in the prior German patent applications 19520660.6 and 19520704.1.

Another preferred group encompasses chiral compounds of the formula Xb or Xd in which
n equals 2,
$Z^1$ is $H_2C=CH-$ and
Ch is a chiral radical of the formula
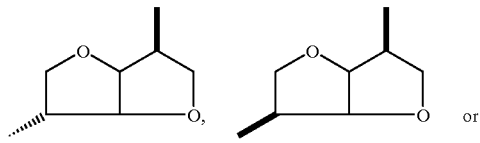
or
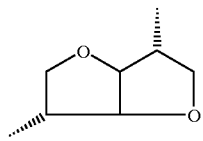
and
Sp, $X^2$, $X^3$, $X^4$, $X^5$ and M are as defined above.
Particularly preferred chiral components are the following compounds (A) to (G):
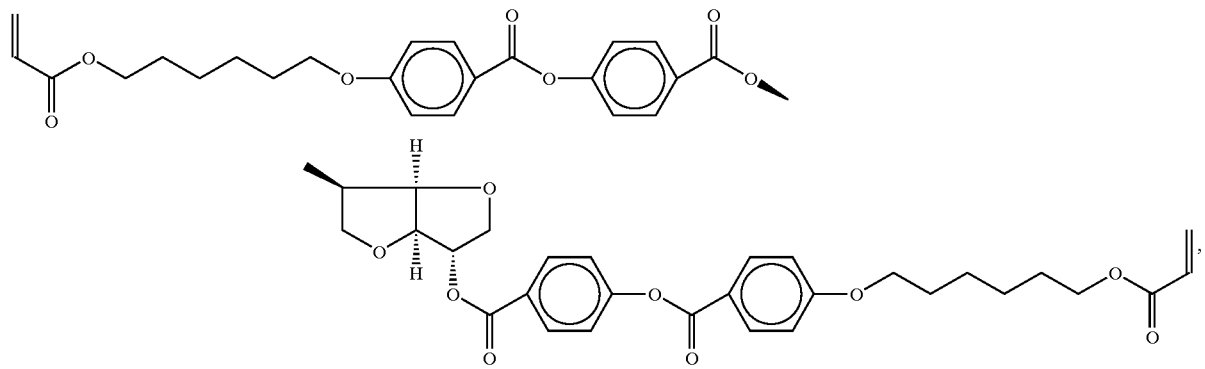
(A)
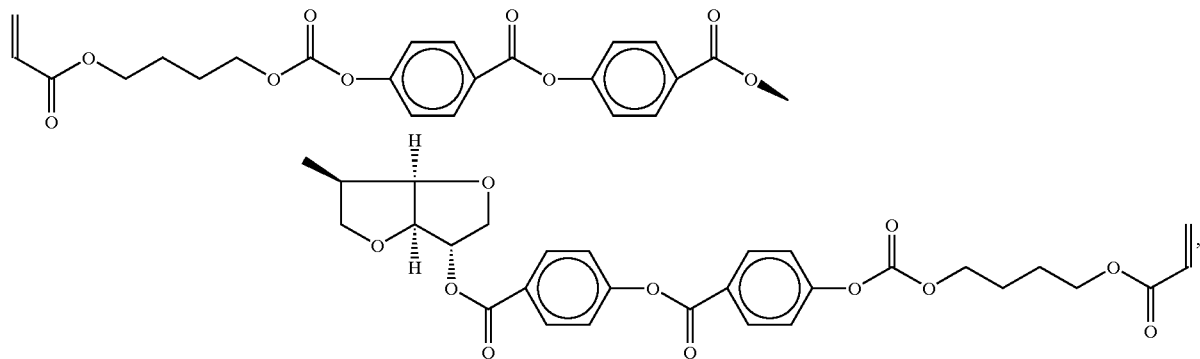
(B)
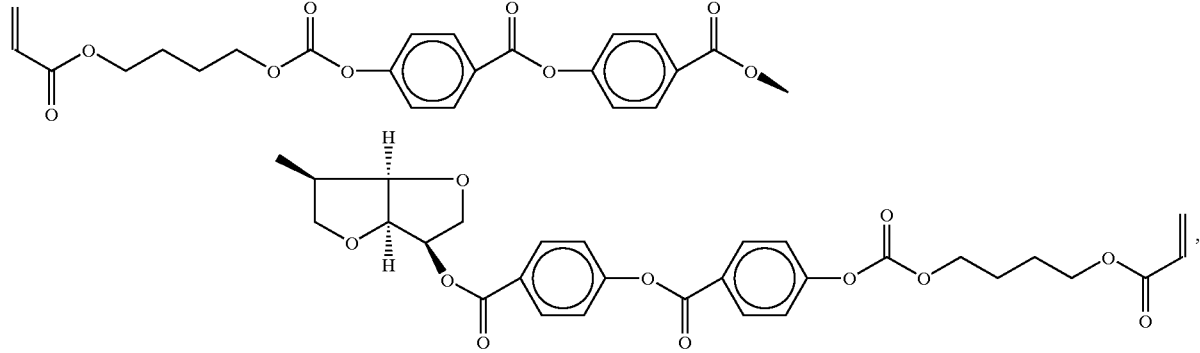
(C)

-continued

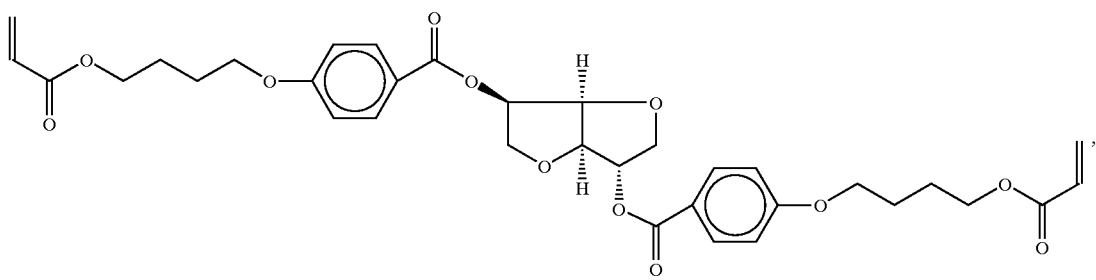
(D)

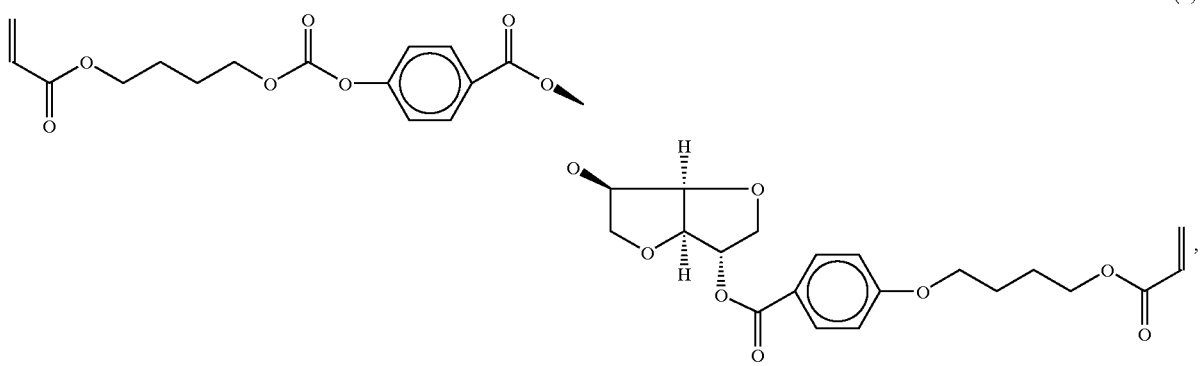
(E)

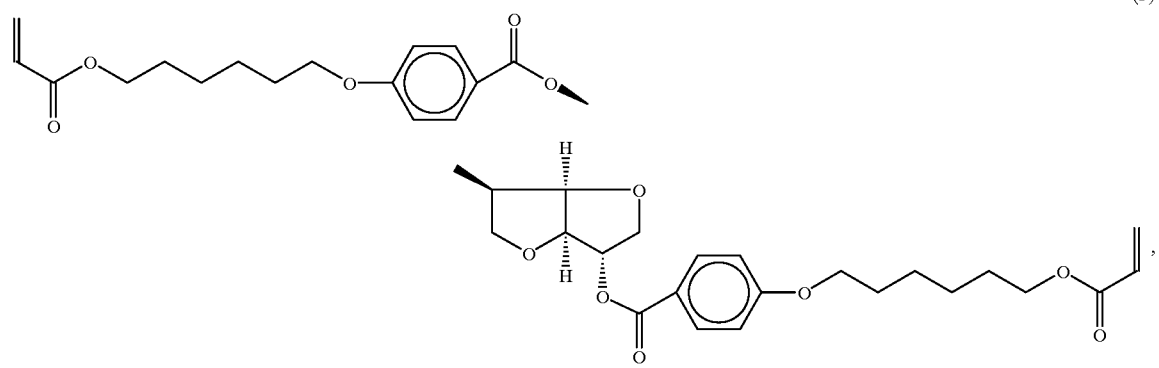
(F)

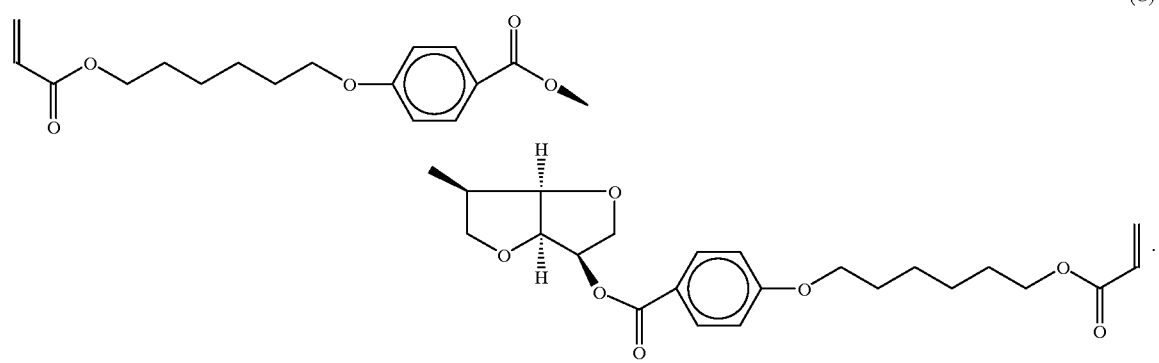
(G)

When the nonchiral compounds of the formula I are used in combination with the above chiral compounds, the molar ratio of nonchiral compound of the formula I to chiral compound of the formula Xa, b, c or d is in the range from about 1:0.01 to 1:0.3, in particular from 1:0.01 to 1:0.25.

Polymerization of the compounds or liquid-crystal compositions according to the invention allows the liquid-crystalline ordered state to be fixed. The polymerization can be carried out, for example, thermally or photochemically, depending on the polymerizable group. Other monomers can also be copolymerized together with the compounds or liquid-crystal compositions according to the invention. These monomers can be other polymerizable liquid-crystalline compounds, chiral compounds, which are likewise preferably copolymerized covalently, or conventional crosslinking agents, such as polyvalent acrylates, vinyl compounds or epoxides. Especially in the case of isocyanates, isothiocyanates or epoxides as polymerizable liquid-crystal compounds, the crosslinking agent is preferably a polyvalent alcohol, meaning that, for example, urethanes can be formed. The crosslinking agent must be matched in its amount to the polymerization conditions in such a way that firstly satisfactory mechanical stability is achieved, but secondly the liquid-crystalline phase behavior is not impaired. The amount of crosslinking agent therefore depends on the specific application of the polymers. For the preparation of pigments, a relatively large amount of crosslinking agent is advantageous, while for the production of thermoplastic layers or, for example, for display alignment layers, a relatively small amount of crosslinking agent is necessary. The amount of crosslinking agent can be determined by a few preliminary experiments.

A further modification of the polymerization products prepared from the compounds or liquid-crystal compositions according to the invention is possible by addition of polymeric auxiliaries prior to polymerization. Auxiliaries of this type should preferably be soluble either in the starting mixtures or alternatively in an organic solvent which is compatible with the starting mixtures. Typical representatives of polymeric auxiliaries of this type are, for example, polyesters, cellulose esters, polyurethanes and polyether- or polyester-modified or unmodified silicones. The amount of polymeric auxiliary to be added, where appropriate, for the desired purpose, its chemical nature and possibly also the amount and nature of the solvent are generally known to the person skilled in the art or can likewise be determined experimentally by a few preliminary experiments.

Besides the compounds of the formulae I and Xa to d, further compounds which are incorporated noncovalently into the polymeric network can also be incorporated. These can be, for example, commercially available nematic liquid crystals.

Further additives can be pigments, dyes, fillers, stabilizers, such as, in particular, UV stabilizers, flow control agents, photoinitiators, dispersants and the like.

The pigments can be inorganic compounds, for example iron oxides, titanium oxide and carbon black, and the organic compounds can be, for example, pigments or dyes from the classes of the monoazo pigments, monoazo dyes and metal salts thereof, disazo pigments, condensed disazo pigments, isoindoline derivatives, derivatives of naphthalene and perylene tetracarboxylic acid, anthraquinone pigments, thioindigo derivatives, azomethine derivatives, quinacridones, dioxazins, pyrazoloquinazolones, phthalocyanine pigments or basic dyes, such as triarylmethane dyes and salts thereof.

The present invention furthermore provides pigments comprising at least one compound of the formula I in crosslinked form. The compounds of the formula I according to the invention can be processed to cholesteric special-effect pigments in a conventional manner in combination with conventional chiral compounds, in particular compounds of the above formula Xa to d. A crosslinkable mixture of these compounds is applied to a support in a conventional manner, for example by spraying, rolling, knife-coating, roller-coating, printing or casting, the cholesteric phase is formed, i.e. aligned, crosslinked and, if desired, dried. The cholesteric special-effect layer thus formed can then be removed from the support in a conventional manner, and the resulting flakes can be further comminuted and classified, if desired. Pourable mixtures are preferably processed in casting devices and under conditions as described, for example, in WO-A-99/11733, which is incorporated herein by reference.

The layer thickness of the platelet-shaped pigments is from 0.5 to 20 $\mu$m, in particular from 0.5 to 10 $\mu$m, for example from 0.5 to 3 $\mu$m.

The diameter of the pigments according to the invention is from about 1 to 500 $\mu$m, in particular from about 3 to 100 $\mu$m or from 3 to 30 $\mu$m and is about 2 to 20 times the pigment thickness.

The pigments can also be in the form of multilayer pigments comprising one or more cholesteric layers, one or more absorber layers or one or more pigmented absorber layers. These are obtainable, for example, in accordance with the processes described in WO-A-99/11719, WO-A-99/11733 or PCT/EP 99/03106, which are incorporated herein by reference.

The invention furthermore provides a coating composition comprising a composition or a pigment as defined above. Preferred coating compositions are in particular paints and varnishes, which comprise not only the pigments or compositions according to the invention but also customary paint and varnish additives, in particular polymeric binders, dispersants and diluents. Suitable additives are known to those skilled in the art and described, for example, in WO-A-99/11733, which is incorporated herein by reference.

The invention provides the use of a compound according to the invention for producing optical elements, such as, in particular, filters and polarizers, coating compositions, effect films, cosmetic compositions and single- or multilayer cholesteric special-effect pigments.

For the purposes of the present invention, the term "optical elements" is taken to mean all articles which utilize the optical properties of nematic and/or cholesteric liquid crystals. Specific examples of these include retardation films, notch filters, color filters for displays, polarizers, but also simply mirrors for decorative purposes. The three-dimensional shape of the optical elements can be planar, but also with a concave or convex curve. In a particular embodiment, the polymerized films can be comminuted to pigments, incorporated in conventional binders and applied to a support by conventional application methods, such as spraying, roller coating, casting, atomizing, knife coating or printing. The optical elements preferably have a planar shape.

The application of the compounds of the general formula I or mixtures comprising compounds of the general formula I is essential for the quality of the optical elements, since the optical quality of the layers is determined by the application method. Suitable application methods are in general spraying, rolling, roller coating, casting, knife coating and printing.

In a preferred embodiment the liquid-crystalline material is dissolved in a readily volatile solvent in combination with any additives necessary. Suitable solvents are THF, MEK, toluene, ethyl acetate and butyl acetate. Additives which can be employed are polymerization inhibitors or polymerization initiators, flow control agents, aerating agents, adhesives etc. The isotropic solution is transferred to a substrate via a conventional applicator. After passing through a drying tunnel, in which the solvent is removed, the wet film can be fixed with the aid of UV radiation. The resulting films exhibit very high reflectivity. These films are highly suitable as polarizers in LC displays. In one embodiment, a number of layers of such films are laminated one on top of the other by lamination processes, and a polarizer which covers light throughout the visible spectrum can be obtained by suitable choice of selective wavelengths of the selected films (EP 0 720 041).

Color filters can also be produced using mixtures comprising compounds of the general formula I. To this end, the wavelengths required can be applied specifically by application methods customary to those skilled in the art. An alternative application form utilizes the thermochromicity of cholesteric liquid crystals. By adjusting the temperature, the color of the cholesteric layer can be shifted from red via gray to blue. With the aid of masks, certain zones can be polymerized specifically at a defined temperature. The crucial parameter effecting the thermochromicity and the handedness of the cholesteric mixture comprising compounds of the cholesteric mixture comprising compounds of the formula I is the choice of the chiral auxiliary. The chiral auxiliary determines the handedness of reflected light and the thermochromicity of the cholesteric system.

Besides the optical properties of cholesteric phases comprising compounds of the general formula I, the nematic phase of these substances is also suitable for use in optical elements. In this case, the birefringence of such a system is utilized. Mention may be made here, in particular, of retardation films.

The invention is illustrated below by means of a detailed description of the synthesis of preferred mesogendiols and the subsequent synthesis of preferred liquid-crystalline polymerizable monomers of the formula I according to the invention.

A. Synthesis of Mesogendiols

1. Synthesis of Binuclear Mesogendiols 2,2'-Dimethyl-4,4'-dihydroxybiphenyl (1a) is synthesized using known methods (Percec et al., Macromolecules (1996) 29, 3727; Colon, J. et al., J. Org. Chem (1986) 51, 2627) in accordance with the following reaction scheme 1:

Reaction scheme 1

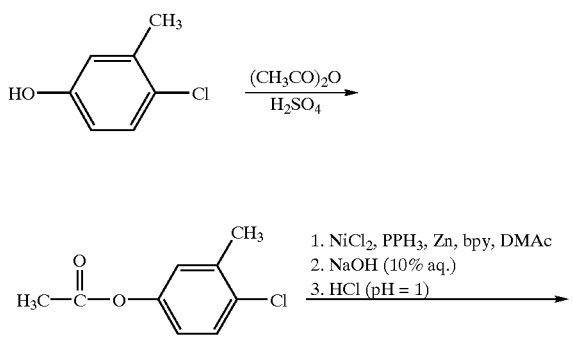

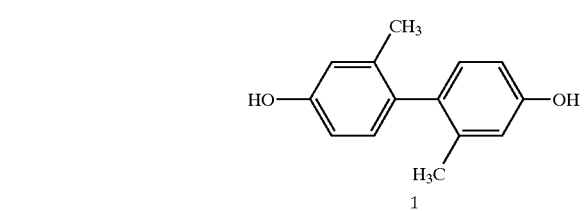

4-Chloro-3-methylphenol is acetylated and the acetylated product is converted into 2,2'-dimethyl-4,4'-diacetyloxybiphenyl by a Ni(0) coupling reaction. The acetyl group is removed by basic hydrolysis and 2,2'-dimethyl-4,4'-dihydroxybiphenyl is released from the phenolate by addition of hydrochloric acid. The product is purified by vacuum distillation and subsequent recrystallization from toluene. After purification, the mesogendiol is obtained in 61% yield.

2. Synthesis of Trinuclear Mesogendiols

The trinuclear mesogendiols consist of a central hydroquinone unit and two terminal 4-hydroxybenzoic acid units. They have the following structure:

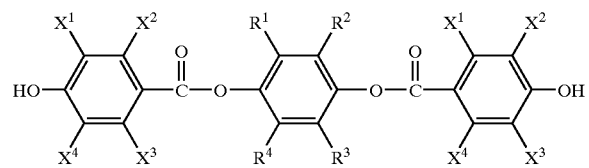

Both the hydroquinone unit and the two 4-hydroxybenzoic acid units can carry one or more substituents $R^1$–$R^4$ or $X^1$–$X^4$.

Trinuclear mesogendiols can be synthesized in principle via two routes. The choice of synthesis route depends in particular on the substitution pattern of the central hydroquinone unit. This pattern determines the synthesis route for preparing the trinuclear mesogendiols.

Mesogendiols containing unsubstituted or only methyl-substituted hydroquinone units can be prepared, as described in DE-A-197 16 822, in accordance with the following reaction scheme 2, exemplified for the synthesis of 1,4-phenylene-bis-(4-hydroxy)benzoate (2a):

Reaction scheme 2

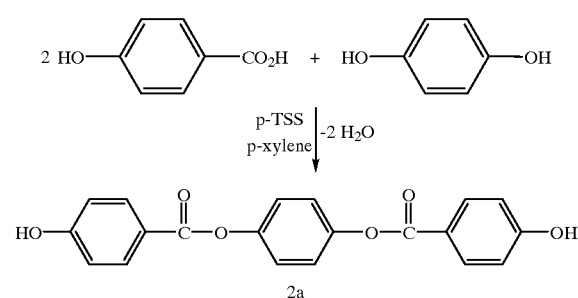

4-Hydroxybenzoic acid and hydroquinone in a molar ratio of 2:1 are added to p-xylene. Neither 4-hydroxybenzoic acid nor hydroquinone is completely soluble in p-xylene. Azeotropic esterification using p-toluenesulfonic acid (p-TSS) as a catalyst yields the trinuclear mesogendiol 1,4-phenylene-bis-(4-hydroxy)benzoate which is again insoluble in xylene. The mesogendiols prepared by this method are obtained in yields of up to 85%.

The following three trinuclear mesogendiols are prepared in accordance with the above reaction scheme:

TABLE

Trinuclear mesogendiols prepared by azeotropic esterification

HO—[Mesogen]—OH

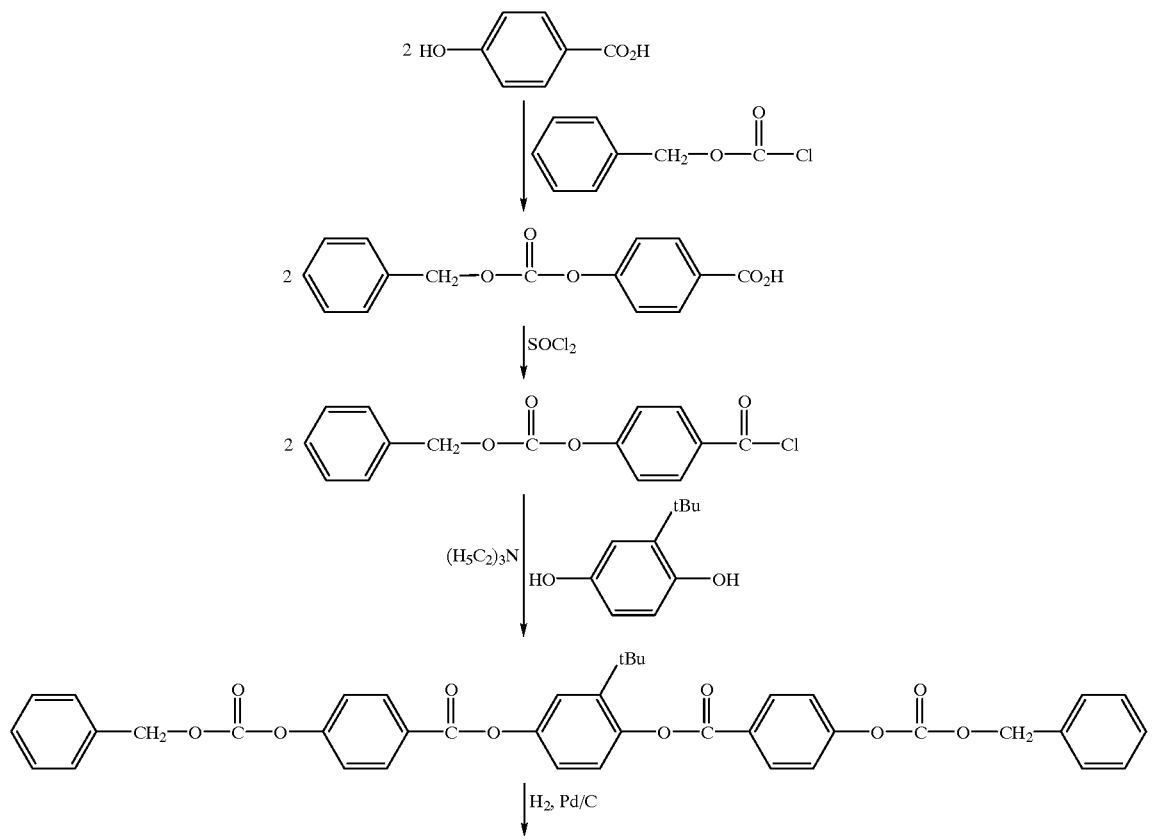

Trinuclear mesogendiols in which the hydroquinone unit carries one or more bulky groups are preferably prepared by a different route. Examples of said bulky groups are tert-butyl or aryl radicals. Trinuclear mesogendiols of this type are prepared in accordance with reaction scheme 3, for example using tert-butyl-hydroquinone (Galli et al., Polymer Bulletin (1989) 21, 563).

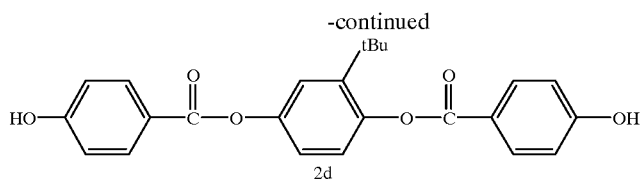
2d

The phenolic hydroxyl group of 4-hydroxybenzoic acid is protected using benzyl chloroformate. The 4-hydroxybenzoic acid thus protected is subsequently reacted with thionyl chloride to give the corresponding acid chloride. The reaction of the latter with tert-butyl hydroquinone in the presence of triethylamine as acid-scavenging base yields the hydroxy-protected diester. In a final reaction step, the protective groups are removed by catalytic hydrogenation over a palladium catalyst. The esogendiols prepared by this procedure were obtained in yields of up to 40%. The low overall yield results from low yields in the preparation of the benzyl-protected mesogendiols. Examples of trinuclear mesogendiols which can be prepared in accordance with this reaction scheme are listed in the table below.

TABLE

31 Trinuclear mesogendiols carrying bulky groups

HO—[Mesogen]—OH

[structure 2d]

[structure 2e]

[structure 2f]

3. Synthesis of Tetranuclear Mesogendiols

The reactions described above for the synthesis of trinuclear mesogendiols can likewise be applied to tetranuclear mesogendiols. The structure of the tetranuclear mesogendiols differs from that of the trinuclear mesogendiols merely in that the central part of the molecule does not consist of a hydroquinone unit but of a binuclear aromatic diol component. The examples of two tetranuclear mesogendiols which can be used according to the invention are listed in the table below. The compounds were prepared by azeotropic esterification in p-xylene using p-toluenesulfonic acid as catalyst. Yields were up to 77%.

TABLE

Tetranuclear mesogendiols prepared by azeotropic esterification

HO—[Mesogen]—OH

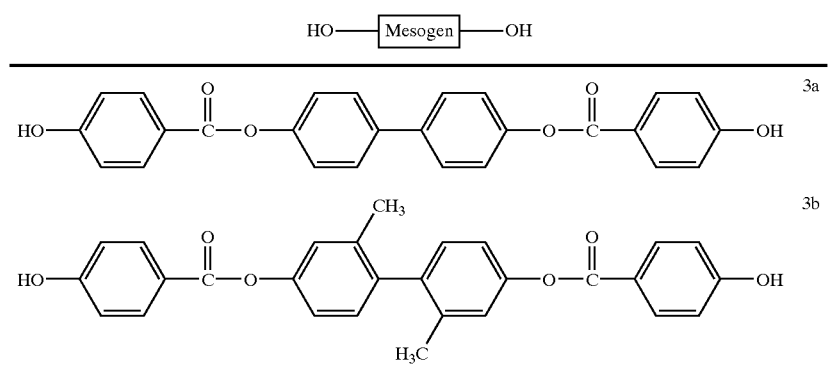

B. Synthesis of Novel Liquid-crystalline Tetraacrylates

Preferred liquid-crystalline tetraacrylates according to the invention are obtainable via 3,4-di-(6-acryloyloxyhexyloxy) benzoic acid. 3,4-Di-(6-acryloyloxyhexyloxy)benzoic acid is synthesized in a conventional manner (Stohr, Dissertation, University of Bayreuth, 1996). The synthesis is depicted in reaction scheme 4 below:

Reaction scheme 4

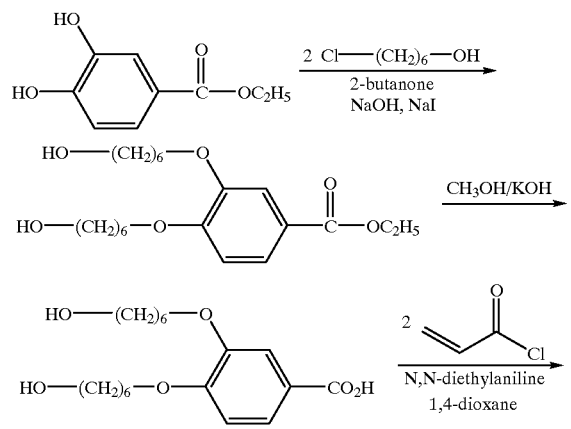

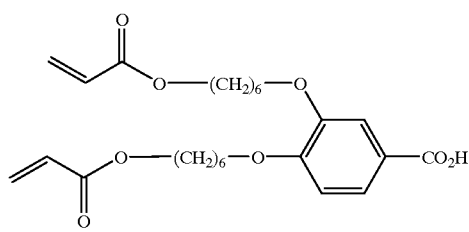

In the first step of this synthesis, ethyl 3,4-dihydroxybenzoate is subjected to basic etherification with 6-chlorohexanol. The ethyl ester is subsequently hydrolyzed with methanolic potassium hydroxide solution to isolate the free acid. The latter was then esterified with acryloyl chloride in 1,4-dioxane using diethylaniline as base to scavenge the hydrochloric acid that had been liberated. In a second step, the acid is then converted into the acid chloride and reacted with various mesogendiols. This second stage is depicted in reaction scheme 5 below:

Reaction scheme 5

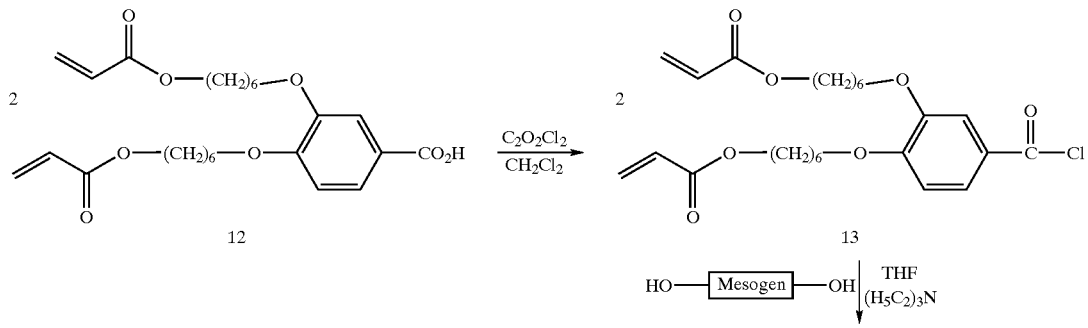

-continued

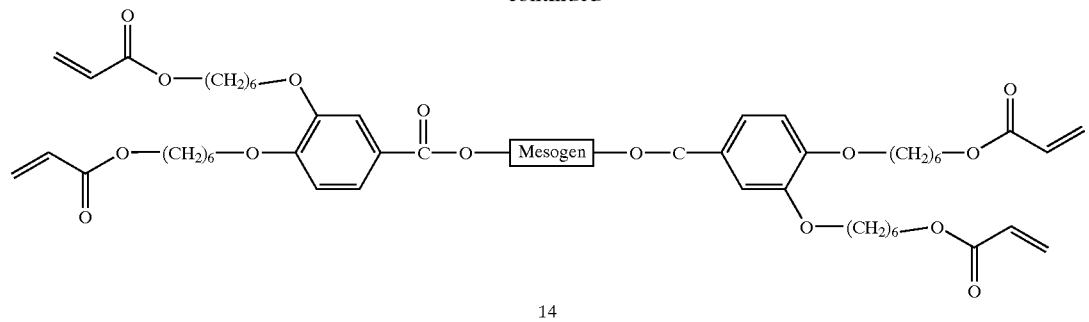

14

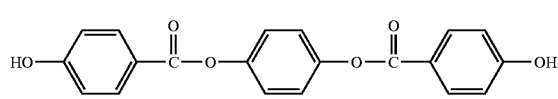

2a

2b

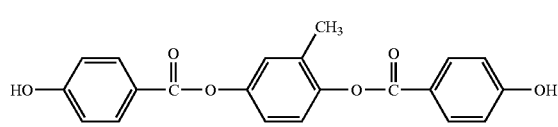

3a

3b

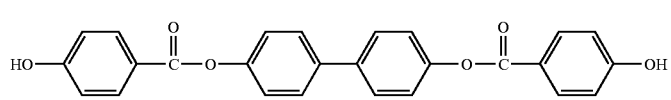

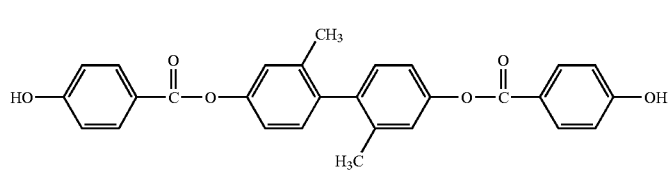

To this end, 3,4-di-(6-acryloyloxyhexyloxy)benzoic acid was converted into the acid chloride using oxalyl chloride. Without further purification, the latter was then reacted with the respective mesogendiol in THF in a ratio of 2:1. Triethylamine was used as a base to bind the hydrochloric acid formed during esterification. All tetraacrylates thus prepared were subsequently purified by column chromatography. Tetraacrylate yields were between 42% and 72%.

The structure of the tetraacrylates synthesized in accordance with the above reaction scheme are summarized in the following table.

TABLE

Tetraacrylates synthesized and their mesophase behavior

14a

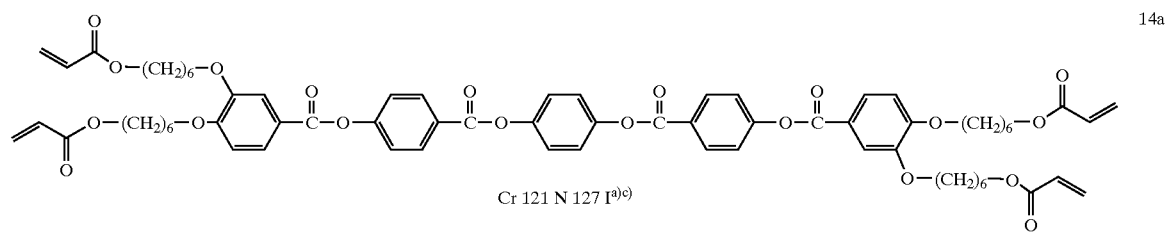

Cr 121 N 127 I[a)c)]

TABLE-continued

Tetraacrylates synthesized and their mesophase behavior

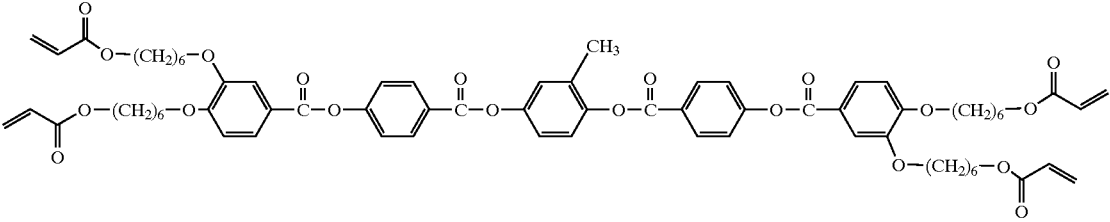

Cr 107 N 122 I[a)]                                                                                 14b

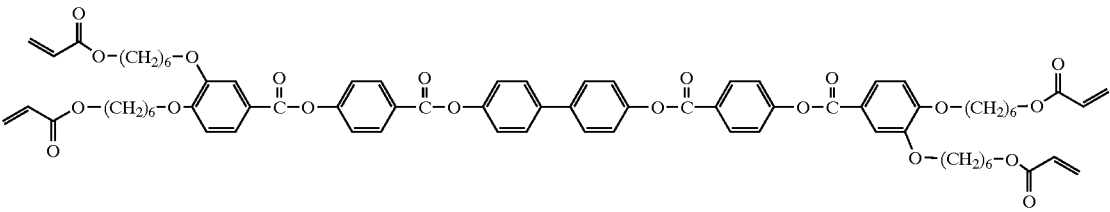

Cr 123 N 155 I[a)]                                                                                 14c

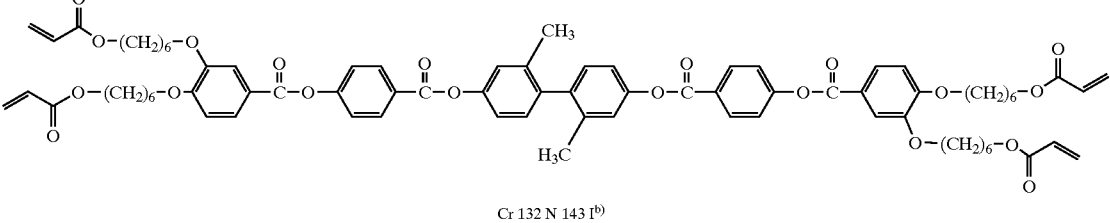

Cr 132 N 143 I[b)]                                                                                 14d

[a)]DSC, 2nd heating, inhibitor content: 2% by weight of sulfur, heating rate 10 K/min
[b)]Polarization microscope
[c)]Cr = crystalline; N = nematic; I = isotropic The phase behavior of the tetraacrylates was analyzed by means of DSC and polarization microscopy. 2% by weight of sulfur were added as inhibitor to prevent thermal polymerization during the analysis. A nematic mesophase was detected for all four tetraacrylates. Of the tetraacrylates having a pentanuclear mesogenic unit, 14a exhibits a nematic mesophase between 121° C. and 127° C. and 14b exhibits a nematic mesophase between 107° C. and 122° C. The methyl substitution on the mesogenic unit leads to a decrease both in melting point and in clearing point compared to the unsubstituted system 14a. The effect of the substituent on the melting point is significantly stronger than the effect on the clearing point.

Of the tetraacrylates having a hexanuclear mesogenic unit, 14c exhibits a nematic mesophase between 123° C. and 155° C. The tetraacrylate 14d likewise shows nematic behavior. In the case of this tetraacrylate, however, the nematic mesophase cannot be detected in the DSC heating curve, whereas a fluid mesophase between 132° C. and 143° C. is observed under the polarization microscope. Only the DSC cooling curve shows a mesophase having a clearly noticeable transition between isotropic and nematic phase. The introduction of the two methyl groups leads to a significant reduction in the phase width compared to 14c. It is interesting that the melting point is increased on introduction of two methyl groups, whereas the introduction of one methyl group led to a decrease in the melting point in the case of 14b. In the case of 14b and 14c, the DSC measurements show additional transitions in the crystalline region. These transitions were not analyzed any further.

On the basis of the specific instructions given above, the person skilled in the art can carry out usual modifications of the specific embodiments described to obtain further compounds according to the invention.

The examples which follow illustrate the invention.

EXPERIMENTAL SECTION

| Apparatus and auxiliaries | |
|---|---|
| IR spectroscopy: | BIO-RAD Digilab FTS-40 (FT IR) |
| $^1$H NMR spectroscopy: | BRUKER AC 250 (250 MHz) |
| $^{13}$C NMR spectroscopy: | BRUKER AC 250 (62.5 MHz) |
| DSC: | PERKIN-ELMER DSC 7 |
| Polarization microscopy: | NIKON Diaphot with Mettler FP82 hot bench, Mettler FP90 control unit |

CHEMICALS AND SOLVENTS

Dioxane was dried by refluxing over potassium and was distilled off under protective gas. Tetrahydrofuran was initially refluxed over potassium hydroxide, distilled off, again refluxed over potassium and finally distilled off under protective gas. Methylene chloride was dried by refluxing over calcium hydride and distilled off under protective gas. All other solvents were distilled through packed columns and used without further drying. Triethylamine was refluxed over potassium hydroxide and distilled off under protective gas. Acryloyl chloride was purified by double fractionated distillation under protective gas using 2,6-di-tert-butyl-p-cresol as stabilizer. All other chemicals used were commercially available in sufficient purity and therefore used without further purification.

Reference Example 1

Preparation of Mesogendiols

The following mesogendiols were prepared:

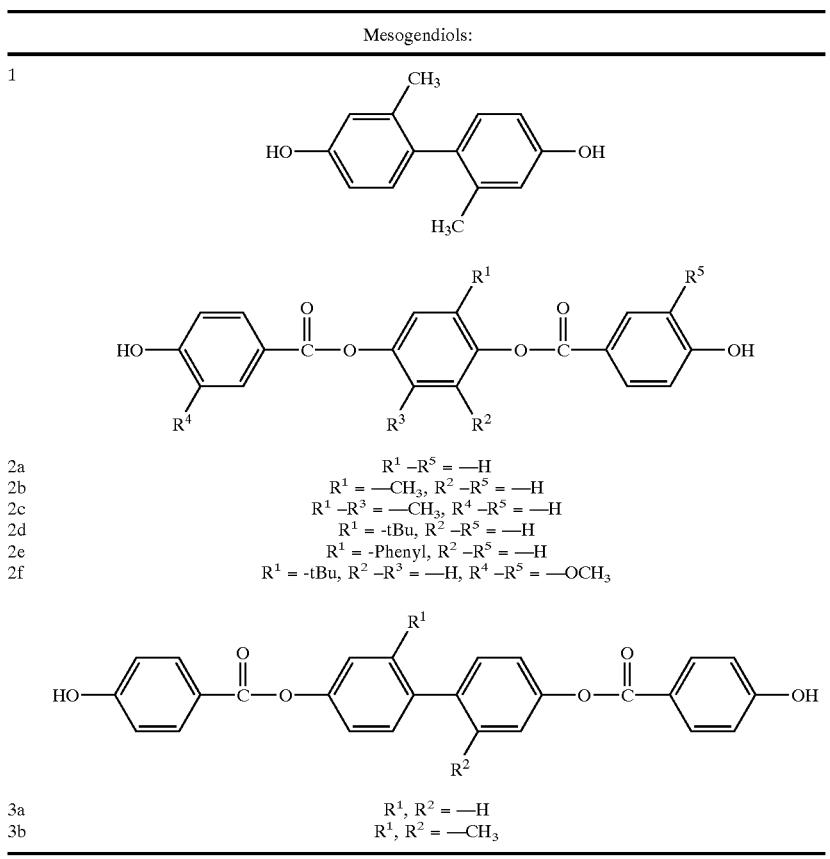

Reference Example 1.1

Preparation of 2,2'-dimethyl-4,4'-dihydroxybiphenyl (1)

a) 4-Chloro-3-methylphenyl Acetate 43.0 g (0.30 mol) of 4-chloro-3-methylphenol, 34 ml (0.36 mol) of acetic anhydride and a few drops of concentrated sulfuric acid were stirred for 2 h at 60° C. in a 250 ml flask equipped with a reflux condenser. The reaction mixture was cooled to room temperature, poured into 200 ml of water and stirred for 1 h at room temperature. The mixture was then extracted with 400 ml of diethyl ether. The organic phase was dried over magnesium sulfate and the ether was distilled off. The raw product is subsequently distilled under reduced pressure (b.p. 65–68° C., 20 mbar).

Yield: 52.5 g (95% of theory) in the form of a colorless liquid

Characterization:

IR (film): ν (cm$^{-1}$): 3050, 2985, 2957, 2923, 1770, 1611, 1581, 1479, 1370, 1053, 1017, 899, 814, 705, 684.

$^1$H NMR (CDCl$_3$): δ (ppm): 7.32 (d, 1H, ortho to —Cl), 6.96 (d, 1H, ortho to —CH$_3$), 6.87 (dd, 1H, para to —CH$_3$), 2.35 (s, 3H, —OOC—C$\underline{H}_3$), 2.27 (s, 3H, —C$\underline{H}_3$).

b) 2,2'-Dimethyl-4,4'-dihydroxybiphenyl 2.08 g (0.016 mol) of nickel dichloride, 20.9 g (0.080 mol) of triphenylphosphane (PPh$_3$), 30.1 g (0.460 mol) of zinc powder, 2.51 g (0.016 mol) of 2,2'-bipyridine (bpy) and 160 ml of dimethylacetamide (DMAc) are introduced into a 500 ml flask equipped with a reflux condenser. The reaction mixture is heated to 65° C. 52.5 g (0.285 mol) of 4-chloro-3-methylphenyl acetate are added, and the reaction mixture is stirred for 4 h at 70° C. The reaction mixture is cooled to room temperature, filtered, poured onto 500 ml of a 2.5 molar sodium hydroxide solution and stirred overnight. The mixture is washed with 300 ml of diethyl ether, and the aqueous phase is acidified with concentrated hydrochloric acid (pH=1). The aqueous phase is then extracted with 800 ml of diethyl ether and the diethyl ether is distilled off. The raw product is distilled under reduced pressure (b.p. 167–170° C., 0.01 mbar) and subsequently recrystallized twice from toluene.

Yield: 18.5 g (61% of theory) in the form of a white solid

Characterization:

IR (KBr): ν (cm$^{-1}$): 3328, 3023, 2921, 1606, 1583, 1488, 1452, 1233, 1160, 814.

$^1$H NMR (DMSO): δ (ppm): 9.19 (s, 2H, O$\underline{H}$), 6.79 (d, 2H, meta to —CH$_3$), 6.65 (d, 2H, ortho to —CH$_3$), 6.57 (dd, 2H, para to —CH$_3$), 1.89 (s, 6H, —C$\underline{H}_3$).

$^{13}$C NMR (DMSO): δ (ppm): 156.26, 136.90, 132.07, 130.69, 116.50, 112.66 (aromatic), 19.98 (—CH$_3$).

Melting point: 137–138° C.

Reference Example 1.2

Preparation of Mesogendiols by Azeotropic Esterification

A) General procedure: The respective 4-hydroxybenzoic acid and the respective aromatic diol are introduced together with p-toluenesulfonic acid in p-xylene into a flask equipped with a water separator and refluxed for 24 h. After water separation is complete, the reaction mixture is cooled to room temperature and the raw product is filtered off.

B) Compounds prepared in accordance with the general procedure:

a) 1,4-Phenylene-bis-(4-hydroxy)benzoate (2a)

Purification: The raw product is suspended in 100 ml of ethanol, stirred for several hours at room temperature and then separated by filtration. The product is obtained in the form of a white solid.

| Batch: | 3.30 g | (0.03 mol) | of hydroquinone |
|---|---|---|---|
| | 8.29 g | (0.06 mol) | of 4-hydroxybenzoic acid |
| | 0.60 g | (0.003 mol) | of p-toluenesulfonic acid |
| | 150 ml | | of p-xylene |

Yield: 8.50 g (81% of theory) in the form of a white solid
Characterization:
IR (KBr): ν (cm$^{-1}$): 3380, 3069, 1693, 1611, 1593, 1514, 1286, 1166, 1081, 901, 847.
$^1$H NMR (DMSO): δ (ppm): 10.54 (s, 2H, —O$\underline{H}$), 8.00 (d, 4H, aromatic), 7.31 (s, 4H, aromatic), 6.94 (d, 4H, aromatic).
$^{13}$C NMR (DMSO): δ (ppm): 164.65 (—$\underline{C}$OO—), 162.699, 148.39, 132.52, 123.19, 119.49, 115.86 (aromatic).
Decomposition (T$_{on}$): 294° C.

b) 2-Methyl-1,4-phenylene-bis-(4-hydroxy)benzoate (2b)

Purification: The raw product is slurried in 100 ml of diethyl ether, stirred for several hours at room temperature and then separated by filtration. The product is obtained in the form of a white solid.

| Batch: | 3.72 g | (0.03 mol) | of 2-methylhydroquinone |
|---|---|---|---|
| | 8.29 g | (0.06 mol) | of 4-hydroxybenzoic acid |
| | 0.60 g | (0.003 mol) | of p-toluenesulfonic acid |
| | 150 ml | | of p-xylene |

Yield: 9.31 g (85% of theory) in the form of a white solid
Characterization:
IR (KBr): ν (cm$^{-1}$): 3392, 3077, 2928, 1697, 1609, 1594, 1513, 1281, 1161, 1078, 847.
$^1$H NMR (DMSO): δ (ppm): 10.53 (s, 2H, —O$\underline{H}$), 8.00 (t, 4H, aromatic), 7.17 (m, 3H, aromatic), 6.94 (dd, 4H, aromatic), 2.15 (s, 3H, Ar—C$\underline{H}_3$).
$^{13}$C NMR (DMSO): δ (ppm): 164.65, 164.32 (—$\underline{C}$OO—), 163.03, 162.96, 40 148.33, 146.98, 132.48, 131.66, 124.37, 123.34, 120.60, 119.51, 119.31, 115.85 (aromatic), 16.01 (—$\underline{C}$H$_3$).
Decomposition (T$_{on}$): 276° C.

c) 2,3,5-Trimethyl-1,4-phenylene-bis-(4-hydroxy)benzoate (2c)

Purification: The raw product is slurried in 100 ml of diethyl ether, stirred for several hours at room temperature and then separated by filtration. The raw product is then recrystallized from 1000 ml of methanol. The product is obtained in the form of a white solid.

| Batch: | 4.56 g | (0.03 mol) | of 2,3,5-trimethylhydroquinone |
|---|---|---|---|
| | 8.29 g | (0.06 mol) | of 4-hydroxybenzoic acid |
| | 0.60 g | (0.003 mol) | of p-toluenesulfonic acid |
| | 150 ml | | of p-xylene |

Yield: 6.65 g (57% of theory) in the form of a white solid
Characterization:
IR (KBr): ν (cm$^{-1}$): 3414, 1705, 1606, 1588, 1512, 1273, 1162, 1087, 848.
$^1$H NMR (DMSO): δ (ppm): 10.54 (s, 2H, —O$\underline{H}$), 8.01 (t, 4H, aromatic), 6.98 (s, 1H, aromatic), 6.94 (dd, 4H, aromatic), 2.06 (s, 3H, Ar—C$\underline{H}_3$), 2.03 (s, 3H, Ar—C$\underline{H}_3$), 2.02 (s, 3H, Ar—C$\underline{H}_3$).
$^{13}$C NMR (DMSO): δ (ppm): 164.43, 163.94 (—$\underline{C}$OO—), 163.04, 151.80, 146.57, 145.68, 132.41, 130.30, 128.39, 127.57, 121.72, 119.36, 119.04, 115.91 (aromatic), 16.02, 13.11, 12.74 (Ar—$\underline{C}$H$_3$).
Decomposition (T$_{on}$): 298° C.

d) 4,4'-Biphenylene-bis-(4-hydroxy)benzoate (3a)

Purification: Recrystallization from 1500 ml of cyclohexanone.

| Batch: | 8.75 g | (0.047 mol) | of 4,4'-dihydroxybiphenyl |
|---|---|---|---|
| | 12.98 g | (0.094 mol) | of 4-hydroxybenzoic acid |
| | 2.00 g | (0.01 mol) | of p-toluenesulfonic acid |
| | 250 ml | | of p-xylene |

Yield: 15.40 g (77% of theory)
Characterization:
IR (KBr): ν (cm$^{-1}$): 3415, 1703, 1603, 1587, 1511, 1279, 1197, 1160, 1079, 1004, 851.
$^1$H NMR (DMSO): δ (ppm): 10.52 (s, 2H, —O$\underline{H}$), 8.00 (d, 4H, aromatic), 7.74 (d, 4H, aromatic), 7.32 (d, 4H, aromatic), 6.93 (d, 4H, aromatic).
$^{13}$C NMR (DMSO): δ (ppm): 164.57 (—$\underline{C}$OO—), 162.95, 150.56, 137.14, 132.48, 127.95, 122.72, 119.51, 115.84 (aromatic).
Decomposition (T$_{on}$): 320° C.

e) 2,2'-Dimethyl-4,4'-biphenylene-bis-(4-hydroxy)benzoate (3b)

Purification: Recrystallization from 700 ml of 1,4-dioxane

| Batch: | 9.43 g | (0.044 mol) | of 2,2'-dimethyl-4,4'-dihydroxybiphenyl |
|---|---|---|---|
| | 12.19 g | (0.088 mol) | of 4-hydroxybenzoic acid |
| | 2.00 g | (0.01 mol) | of p-toluenesulfonic acid |
| | 250 ml | | of p-xylene |

Yield: 14.73 g (74% of theory)
Characterization:
IR (KBr): ν (cm$^{-1}$): 3410, 1700, 1607, 1592, 1513, 1449, 1279, 1221, 1154, 1086, 1007, 850.
$^1$H NMR (DMSO): δ (ppm): 10.52 (s, 2H, —O$\underline{H}$), 7.99 (d, 4H, aromatic), 7.15 (m, 6H, aromatic), 6.93 (d, 4H, aromatic), 2.04 (s, 6H, Ar—C$\underline{H}_3$).
$^{13}$C NMR (DMSO): δ (ppm): 164.53 (—$\underline{C}$OO—), 162.86, 150.07, 137.86, 137.20, 132.37, 130.32, 123.29, 119.58, 115.80 (aromatic), 19.72 (Ar—$\underline{C}$H$_3$).
Decomposition (T$_{on}$): 242° C.

Reference Example 1.3

Preparation of Mesogendiols via Protected 4-hydroxybenzoic Acids

A) General Procedure i) Introduction of a Protective Group at the Hydroxyl Function of the 4-hydroxybenzoic Acid The respective 4-hydroxybenzoic acid is dissolved in 1 M aqueous sodium hydroxide solution. The benzyl chloroformate is added dropwise at 0° C. The reaction mixture is stirred for 2 h and then poured into 2 M hydrochloric acid. The resulting precipitate is separated by filtration and recrystallized.

ii) Preparation of the Hydroxy-protected Mesogendiol

The protected 4-hydroxybenzoic acid is dissolved in 1,2-dichloroethane. Thionyl chloride is added and the solution is refluxed for 2 h. The solvent and unreacted thionyl chloride are distilled off under reduced pressure. The resulting carbonyl chloride is dissolved in 1,2-dichloroethane and added dropwise to a solution of an aromatic diol and triethylamine in 1,2-dichloroethane. The reaction mixture is refluxed for 2 h, cooled to room temperature and filtered. 1,2-Dichloroethane is distilled off under reduced pressure, and the residue is taken up in chloroform and washed with water. The organic phase is dried over $Na_2SO_4$. The chloroform is then distilled off and the raw product is purified by recrystallization.

iii) Libration of the Mesogendiol by Catalytic Removal of the Protective Groups

The protected mesogendiol is added to tetrahydrofuran together with palladium on activated carbon (5%). The reaction mixture is saturated with hydrogen and then stirred under a hydrogen atmosphere at 40° C. overnight. The reaction mixture is then filtered and the THF is distilled off.

B) Compounds Prepared According to the General Procedure:

a) Benzyloxy-4-hydroxybenzoic acid

Purification: Recrystallization from 1200 ml acetone/water 1:1

| Batch: | 20.00 g | (0.143 mol) | of 4-hydroxybenzoic acid |
|---|---|---|---|
| | 29.6 g | (0.173 mol) | of benzyl chloroformate |
| | 300 ml | | of 1 M sodium hydroxide solution |
| | 500 ml | | of 2 M hydrochloric acid |

Yield: 29.3 g (75% of theory) in the form of a white solid
Characterization:
IR (KBr): $\nu$ (cm$^{-1}$): 3036, 2874, 2673, 2544, 1754, 1696, 1608, 1428, 1163, 957, 853.
$^1$H NMR (DMSO): $\delta$ (ppm): 13.10 (s, 1H, —COO$\underline{H}$), 8.00 (d, 2H, aromatic), 7.40 (m, 7H, aromatic), 5.29 (s, 2H, Ar—C$\underline{H}_2$—OCOO—).

b) Benzyloxy-4-hydroxyvanillic acid

Purification: Recrystallization from a mixture of 450 ml of water and 250 ml of acetone

| Batch: | 18.90 g | (0.11 mol) | of vanillic acid |
|---|---|---|---|
| | 25.60 g | (0.15 mol) | of benzyl chloroformate |
| | 400 ml | | of 1 M sodium hydroxide solution |
| | 1000 ml | | of 2 M hydrochloric acid |

Yield: 20.3 g (61% of theory)
Characterization:
IR (KBr): $\nu$ (cm$^{-1}$): 2963, 2619, 1780, 1761, 1686, 1608, 1427, 1241, 1182, 1124, 1029.
$^1$H NMR (DMSO): $\delta$ (ppm): 13.10 (s, 1H, —COO$\underline{H}$), 7.58 (m, 2H, aromatic), 7.38 (m, 6H, aromatic), 5.27 (s 2H, Ar—C$\underline{H}_2$—OCOO—), 3.81 (s, 3H, Ar—OC$\underline{H}_3$).

c) 2-tert-Butyl-1,4-phenylene-bis-(4-benzylcarbonato)benzoate

Purification: Recrystallization from 1000 ml of cyclohexane

| Batch: | 35.52 g | (0.13 mol) | of benzyloxy-4-hydroxybenzoic acid |
|---|---|---|---|
| | 12 ml | (0.17 mol) | of thionyl chloride |
| | 150 ml | | of 1,2-dichloroethane |
| | 9.72 g | (0.06 mol) | of tert-butylhydroquinone |
| | 37 ml | (0.26 mol) | of triethylamine |
| | 200 ml | | of 1,2-dichloroethane |

Yield: 17.2 g (43% of theory) in the form of a white solid
Characterization:
IR (KBr): $\nu$ (cm$^{-1}$): 3037, 2952, 2869, 1759, 1736, 1606, 1506, 1390, 1258, 1160, 1073, 727.
$^1$H NMR (CDCl$_3$): $\delta$ (ppm): 8.25 (m, 4H, aromatic), 7.3 (m, 17 H, aromatic), 5.30 (s, 4H, Ar—C$\underline{H}_2$—OCOO—), 1.40 (s, 9H, Ar—C(C$\underline{H}_3$)$_3$).

d) 2-Phenyl-1,4-phenylene-bis-(4-benzylcarbonato)benzoate

Purification: Recrystallization from 1000 ml of cyclohexane

| Batch: | 29.3 g | (0.11 mol) | of benzyloxy-4-hydroxybenzoic acid |
|---|---|---|---|
| | 12 ml | (0.17 mol) | of thionyl chloride |
| | 150 ml | | of 1,2-dichloroethane |
| | 7.91 g | (0.043 mol) | of phenylhydroquinone |
| | 31 ml | (0.22 mol) | of triethylamine |
| | 200 ml | | of 1,2-dichloroethane |

Yield: 16.0 g (54% of theory) in the form of a white solid
Characterization:
IR (KBr): $\nu$ (cm$^{-1}$): 2960, 2923, 1758, 1737, 1605, 1508, 1486, 1411, 1381, 1255, 1162, 1078, 1016.
$^1$H NMR (CDCl$_3$): $\delta$ (ppm): 8.24 (dd, 2H, aromatic), 8.04 (dd, 2H, aromatic), 7.34 (m, 23H, aromatic), 5.29 (s, 2H, Ar—C$\underline{H}_2$—OCOO—), 5.27 (s, 2H, —C$\underline{H}_2$—OCOO—).

e) 2-tert-Butyl-1,4-phenylene-bis-(3-methoxy-4-benzylcarbonato)benzoate

Purification: Reprecipitated in ice water from a solution in THF

| Batch: | 12.04 g | (0.04 mol) | of benzyloxyvanillic acid |
|---|---|---|---|
| | 7.3 ml | (0.1 mol) | of thionyl chloride |
| | 70 ml | | of 1,2-dichloroethane |
| | 2.66 g | (0.016 mol) | of tert-butylhydroquinone |
| | 11.4 ml | (0.08 mol) | of triethylamine |
| | 130 ml | | of 1,2-dichloroethane |

Yield: 5.98 g (51% of theory)
Characterization:
IR (KBr): $\nu$ (cm$^{-1}$): 2968, 1768, 1738, 1607, 1508, 1413, 1288, 1248, 1166, 1083, 1027, 741.
$^1$H NMR (CDCl$_3$): $\delta$ (ppm): 7.85 (m, 4H, aromatic), 7.38 (m, 14H, aromatic), 7.14 (s, 1H, aromatic), 5.30 (s, 4H, Ar—C$\underline{H}_2$—OCOO—), 3.89 (s, 6H, Ar—OC$\underline{H}_3$), 1.39 (s, 9H, Ar—C(C$\underline{H}_3$)$_3$).

f) 2-tert-Butyl-1,4-phenylene-bis-(4-hydroxy)benzoate (2d)

| Batch: | 22.6 g | (0.033 mol) | of 2-tert-butyl-1,4-phenylene-bis-(4-benzylcarbonato)benzoate |
| --- | --- | --- | --- |
| | 2.5 g | | of palladium on activated carbon (5%) |
| | 200 ml | | of THF |

Yield: 12.0 g (89% of theory) in the form of a white solid
Characterization:
IR (KBr): ν (cm$^{-1}$): 3389, 2969, 1700, 1608, 1591, 1514, 1281, 1160, 1079, 851, 766.
$^1$H NMR (DMSO): δ (ppm): 10.54 (s, 2H, —O$\underline{H}$), 8.00 (dd, 4H, aromatic), 7.19 (d, 2H, aromatic), 6.94, (t, 5H, aromatic), 1.30 (s, 9H, Ar—C(C$\underline{H}_3$)$_3$).
$^{13}$C NMR (DMSO): δ (ppm): 164.51, 164.41 (—$\underline{C}$OO—), 162.82, 162.68, 147.85, 146.38, 142.30, 132.23, 125.41, 120.38, 119.45, 119.32, 115.41, 115.57 (aromatic), 34.30 (Ar—$\underline{C}$(CH$_3$)$_3$), 29.80 (Ar—C($\underline{C}$H$_3$)$_3$).
Decomposition (T$_{on}$): 288° C.

g) 2-Phenyl-1,4-phenylene-bis-(4-hydroxy)benzoate (2e)

| Batch: | 15.9 g | (0.023 mol) | of 2-phenyl-1,4-phenylene-bis-(4-benzylcarbonato)benzoate |
| --- | --- | --- | --- |
| | 2.5 g | | of palladium on activated carbon (5%) |
| | 200 ml | | of THF |

Yield: 9.5 g (96% of theory) in the form of a white solid
Characterization:
IR (KBr): ν (cm$^{-1}$): 3392, 3064, 1700, 1608, 1590, 1513, 1482, 1278, 1160, 1079, 852.
$^1$H NMR (DMSO): δ (ppm): 10.51 (s, 2H, —O$\underline{H}$), 8.00 (d, 4H, aromatic), 7.85 (d, 2H, aromatic), 7.33 (m, 8H, aromatic), 6.93, (d, 2H, aromatic), 6.85 (d, 2H, aromatic).
$^{13}$C NMR (DMSO): δ (ppm): 164.36, 164.25 (—$\underline{C}$OO—), 162.76, 162.70, 148.47, 145.05, 136.13, 135.25, 132.31, 132.15, 128.61, 128.38, 127.82, 124.55, 123.71, 122.08, 119.21, 119.01, 115.60 (aromatic).
Decomposition (T$_{on}$): 290° C.

h) 2-tert-Butyl-1,4-phenylene-bis-(3-methoxy-4-hydroxy)benzoate (2f)
Purification: Reprecipitated in water from isopropanol

| Batch: | 11.45 g | (0.016 mol) | of 2-tert-butyl-1,4-phenylene-bis-(3-methoxy-4-benzyl-carbonato)benzoate |
| --- | --- | --- | --- |
| | 1 g | | of palladium on activated carbon (5%) |
| | 100 ml | | of THF |

Yield: 4.7 g (63% of theory) in the form of a yellowish solid
Characterization:
IR (KBr): ν (cm$^{-1}$): 3406, 2965, 2861, 1727, 1596, 1515, 1430, 1284, 1208, 1167, 1076, 870.
$^1$H NMR (CDCl$_3$): δ (ppm): 7.85 (m, 2H, aromatic), 7.70 (dd, 1H, aromatic), 7.13 (m, 4 H, aromatic), 6.17, (d, 2H, aromatic), 3.99 (s, 6H, Ar—OC$\underline{H}_3$), 1.39 (s, 9H, Ar—C(C$\underline{H}_3$)$_3$).
$^{13}$C NMR (CDCl$_3$): δ (ppm): 165.04 (—$\underline{C}$OO—), 150.77, 150.68, 148.16, 146.81, 146.44, 146.33, 142.85, 124.98, 121.59, 121.43, 120.57, 120.00, 114.43, 114.29, 112.31, 112.18 (aromatic), 56.14 (Ar—O$\underline{C}$H$_3$), 34.67 (Ar—$\underline{C}$(CH$_3$)$_3$), 30.06 (Ar—C($\underline{C}$H$_3$)$_3$).
Melting point: 116° C.

Reference Example 2

Preparation of Crosslinkable Spacer Units 3,4-di-(6-acryloyloxyhexyloxy)benzoic Acid

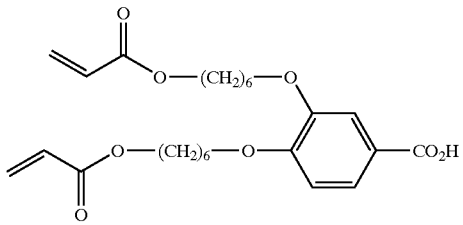

a) 3,4-Di-(6-hydroxyhexyloxy)benzoic acid
10.93 g (0.06 mol) of ethyl 3,4-dihydroxybenzoate were added to 200 ml of 2-butanone. 5.3 g (0.133 mol) of sodium hydroxide, 19.9 g (0.133 mol) of sodium iodide and 17.74 ml (0.133 mol) of 6-chlorohexanol are added and the reaction mixture is stirred for 20 h at 60° C. The 2-butanone is then distilled off. The residue is taken up in 300 ml of 0.4 M sodium hydroxide solution and extracted four times with 100 ml of diethyl ether. The ether phases are combined and concentrated on a rotary evaporator. The residue is dissolved in 200 ml of methanol. 60 ml of 4.5 M potassium hydroxide solution are added and the reaction mixture is refluxed for 20 h. The reaction mixture is concentrated on a rotary evaporator and the residue is taken up in 200 ml of 0.4 M sodium hydroxide solution and washed three times with 100 ml of diethyl ether. The aqueous phase is then acidified with a concentrated hydrochloric acid (pH=1). The product which has precipitated is separated by filtration and recrystallized from 500 ml of water.
Yield: 14.3 g (67% of theory) in the form of a white solid
Characterization:
IR (KBr): ν (cm$^{-1}$): 3327, 2933, 2852, 1670, 1586, 1517, 1442, 1278, 1227, 1141, 869.
$^1$H NMR (DMSO): δ (ppm): 12.59 (s, 1H, —COO$\underline{H}$), 7.51 (dd, 1H, aromatic), 7.41 (d, 1H, aromatic), 7.01 (d, 1H, aromatic), 4.33 (s, 2H, —O$\underline{H}$), 3.97 (m, 4H, Ar—O—C$\underline{H}_2$—), 3.40 (m, 4H, —C$\underline{H}_{(m,}$ 4H, alkoxy—C$\underline{H}_2$), 1.38 (m, 12H, alkoxy—C$\underline{H}_2$).
Melting point: 133–135° C.

b) 3,4-Di-(6-acryloyloxyhexyloxy)benzoic acid
13.6 g (0.04 mol) of 3,4-di-(6-hydroxyhexyloxy)benzoic acid, 9.6 ml (0.06 mol) of N,N-diethylaniline and 100 mg of 2,6-di-tert-butyl-p-cresol as stabilizer are added to 150 ml of 1,4-dioxane and heated to 60° C. At 60° C., 6.9 ml (0.085 mol) of acryloyl chloride are added slowly such that the reaction temperature does not exceed 65° C. The reaction mixture is stirred for 2.5 h at 60° C. The solution is cooled to room temperature and poured onto ice water with stirring. A precipitate of 3,4-di-(6-acryloyloxyhexyloxy)benzoic acid is obtained which is separated by filtration, dried and recrystallized from 300 ml of isopropanol.
Yield: 13.1 g (71% of theory) in the form of a white solid
Characterization:
IR (KBr): ν (cm$^{-1}$): 3086, 2940, 2854, 1723, 1669, 1596, 1441, 1278, 1196, 1042, 868.
$^1$H NMR (DMSO): δ (ppm): 12.55 (s, 1H, —COO$\underline{H}$), 7.51 (dd, 1H, aromatic), 7.41 (d, 1H, aromatic), 7.01 (d, 1H, aromatic), 6.29 (dd, 2H, —CH═C$\underline{H}_2$ trans), 6.14 (dd, 2H, —C$\underline{H}$═CH$_2$), 5.90 (dd, 2H, —CH═C$\underline{H}_2$ cis), 4.03 (m, 8H, Ar—O—C$\underline{H}_2$— and —COO—C$\underline{H}_2$—) alkoxy-C$\underline{H}_2$), 1.61 (m, 4H, alkoxy-C$\underline{H}_2$), 1.41 (m, 8H, alkoxy-C$\underline{H}_2$).

$^{13}$C NMR (DMSO): δ (ppm): 170.27 (—$\underline{C}$OOH), 167.29, 165.68 (—$\underline{C}$OO—CH$_2$), 152.65, 148.06, 131.43, 128.58, 123.48, 123.08, 114.03, 112.48 (aromatic and —CH=CH$_2$), 68.50 (Ar—O—$\underline{C}$H$_2$—), 68.36 (—COO—$\underline{C}$H$_2$—), 28.70, 28.65, 28.27, 25.66, 25.35, 25.27 (alkoxy-$\underline{C}$H$_2$).

Melting point: 90–92° C.

EXAMPLE 1

Preparation of Tetraacrylates

The following tetraacrylates were prepared:

oxalyl chloride are distilled off under reduced pressure. The remaining acid chloride was reacted further without further purification.

ii) Reaction of the Acid Chloride with Mesogendiols

The respective mesogendiol is added to THF together with triethylamine and 2,6-di-tert-butyl-p-cresol as stabilizer (only in the case of acrylates). The acid chloride is dissolved in THF and added with ice cooling. The mixture is then stirred for 24 h at room temperature. The mixture is then filtered and concentrated on a rotary evaporator. The residue is taken up in chloroform and extracted three times with water. The solvent is then evaporated, the raw product obtained is dried under reduced pressure and purified by recrystallization or by column chromatography.

Tetraacrylates:

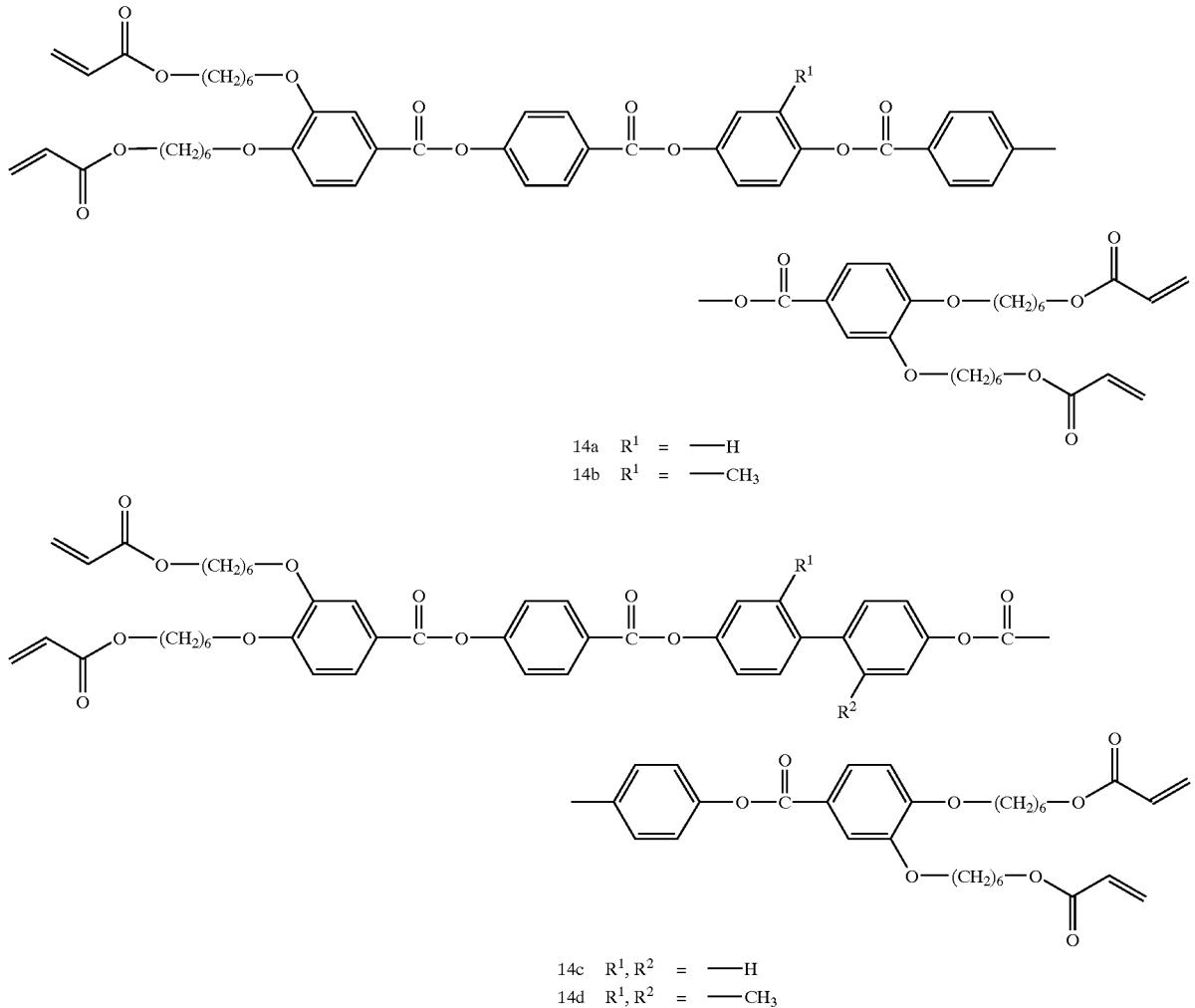

14a R$^1$ = —H
14b R$^1$ = —CH$_3$

14c R$^1$, R$^2$ = —H
14d R$^1$, R$^2$ = —CH$_3$

A) General Procedure for Preparing Tetraacrylates using Acid Chloride i) Preparation of the Acid Chloride The respective spacer-carrying hydroxybenzoic acid is suspended in methylene chloride. Oxalyl chloride is slowly added in a molar excess of about 8–10 times with ice cooling. The reaction mixture is stirred at room temperature until gas evolution is no longer observed. A clear solution is obtained from which the methylene chloride and unreacted B) Tetraacrylates Synthesized in Accordance with the General Procedure a) Tetraacrylate 14a Purification: Column chromatography (chloroform/ethyl acetate 40:1)

Batch: 3.55 g (7.68 · 10$^{-3}$ mol) of 3,4-di-[6-(acryloyloxy-hexyloxy)]benzoic acid -continued

| | | |
|---|---|---|
| 6 ml | (0.070 mol) | of oxalyl chloride |
| 40 ml | | of methylene chloride |
| 1.21 g | (3.45 · 10⁻³ mol) | of 1,4-phenylene-bis-(4-hydroxy)benzoate |
| 2 ml | (0.014 mol) | of triethylamine |
| 100 ml | | of THF |
| 50 mg | | of 2,6-di-tert-butyl-p-cresol |

Yield: 1.84 g (43% of theory) in the form of a white solid

Characterization:

IR (KBr): $\nu$ (cm$^{-1}$): 2939, 2855, 1735, 1599, 1508, 1410, 1270, 1204, 1160, 1065, 1016, 811.

$^1$H NMR (CDCl$_3$): $\delta$ (ppm): 8.23 (d, 4H, aromatic), 7.78 (dd, 2H, aromatic), 7.60 (d, 2H, aromatic), 7.31 (d, 2H, aromatic), 7.19 (s, 4H, aromatic), 6.88 (d, 4H, aromatic), 6.34 (dd, 4H, —CH=C$\underline{H}_2$ trans), 6.06 (dd, 4H, —C$\underline{H}$=CH$_2$), 5.75 (dd, 4H, —CH=C$\underline{H}_2$ cis), 4.08 (m, 16H, —COO—C$\underline{H}_2$— and Ar—O—C$\underline{H}_2$—), 1.84 (m, 8H, alkoxy-C$\underline{H}_2$), 1.66 (m, 8H, alkoxy-C$\underline{H}_2$), 1.45 (m, 16H, alkoxy-C$\underline{H}_2$).

$^{13}$C NMR (CDCl$_3$): $\delta$ (ppm): 166.24, 164.36, 164.31 (—COO—), 155.42, 153.95, 148.59, 148.35, 131.81, 130.51, 128.52, 126.72, 124.60, 122.63, 122.12, 121.02, 114.53, 111.90 (aromatic and —CH=CH$_2$), 69.05, 68.80 (Ar—O—$\underline{C}$H$_2$—), 64.40 (—COO—$\underline{C}$H$_2$—), 28.88, 28.53, 26.56, 25.64, 25.31 (alkoxy-$\underline{C}$H$_2$).

Thermal behavior: Cr 121 N 127 I (DSC, 2nd heating, heating rate 10 K/min, 2% by weight of sulfur).

b) Tetraacrylate 14b

Purification: Column chromatography (chloroform/ethyl acetate 40:1)

| Batch: | 2.00 g | (4.32 · 10⁻³ mol) | of 3,4-di-[6-(acryloyloxy-hexyloxy)]benzoic acid |
|---|---|---|---|
| | 3.5 ml | (0.041 mol) | of oxalyl chloride |
| | 30 ml | | of methylene chloride |
| | 0.71 g | (1.94 · 10⁻³ mol) | of 2-methyl-1,4-phenylene-bis-(4-hydroxy)benzoate |
| | 1 ml | (0.007 mol) | of triethylamine |
| | 80 ml | | of THF |
| | 50 mg | | of 2,6-di-tert-butyl-p-cresol |

Yield: 1.65 g (68% of theory) in the form of a white solid

Characterization:

IR (KBr): $\nu$ (cm$^{-1}$): 2939, 2861, 1731, 1598, 1519, 1430, 1410, 1202, 1158, 1068, 1015, 811.

$^1$H NMR (CDCl$_3$): $\delta$ (ppm): 8.29 (m, 4H, aromatic), 7.84 (dd, 2H, aromatic), 7.67 (d, 2H, aromatic), 7.38 (d, 3H, aromatic), 7.20 (m, 4H, aromatic), 6.95 (d, 2H, aromatic), 6.40 (dd, 4H, —CH=C$\underline{H}_2$ trans), 6.12 (dd, 4H, —C$\underline{H}$=CH$_2$), 5.81 (dd, 4H, —CH=C$\underline{H}_2$ cis), 4.14 (m, 16H, —COO—C$\underline{H}_2$— and Ar—O—C$\underline{H}_2$—), 2.28 (s, 3H, Ar—C$\underline{H}_3$), 188 (m, 8H, alkoxy-C$\underline{H}_2$), 1.72 (m, 8H, alkoxy-C$\underline{H}_2$), 1.52 (m, 16H, alkoxy-C$\underline{H}_2$)

$^{13}$C NMR (CDCl$_3$): $\delta$ (ppm): 166.16, 164.32, 163.93 (—$\underline{C}$OO—), 155.36, 155.32, 153.91, 148.54, 148.30, 146.93, 131.74, 131.71, 130.45, 130.42, 128.48, 126.75, 126.58, 124.55, 124.02, 122.81, 122.11, 122.03, 120.96, 119.96, 114.47, 111.86 (aromatic and —CH=CH$_2$), 68.99, 68.74 (Ar—O—$\underline{C}$H$_2$—), 64.37, 64.34 (—COO—$\underline{C}$H$_2$—), 28.92, 28.81, 28.48, 25.60 (alkoxy-$\underline{C}$H$_2$), 16.36 (Ar—$\underline{C}$H$_3$).

Thermal behavior: Cr 107 N 122 I (DSC, 2nd heating, heating rate 10 K/min, 2% by weight of sulfur).

c) Tetraacrylate 14c

Purification: Column chromatography (chloroform/ethyl acetate 40:1)

| Batch: | 3.04 g | (6.57 · 10⁻³ mol) | of 3,4-di-[6-(acryloyloxy-hexyloxy)]benzoic acid |
|---|---|---|---|
| | 5 ml | (0.058 mol) | of oxalyl chloride |
| | 40 ml | | of methylene chloride |
| | 1.26 g | (2.95 · 10⁻³ mol) | of 4,4'-biphenylene-bis-(4-hydroxy)benzoate |
| | 1.5 ml | (0.01 mol) | of triethylamine |
| | 100 ml | | of THF |
| | 50 mg | | of 2,6-di-tert-butyl-p-cresol |

Yield: 2.79 g (72% of theory) in the form of a white solid

Characterization:

IR (KBr): $\nu$ (cm$^{-1}$): 2937, 2866, 1733, 1597, 1431, 1270, 1193, 1161, 1069, 1005, 879.

$^1$H NMR (CDCl$_3$): $\delta$ (ppm): 8.31 (d, 4H, aromatic), 7.84 (dd, 2H, aromatic), 7.66 (m, 6H, aromatic), 7.36 (m, 6H, aromatic), 6.94 (d, 4H, aromatic), 6.40 (dd, 4H, —CH=C$\underline{H}_2$ trans), 6.12 (dd, 4H, —C$\underline{H}$=CH$_2$), 5.81 (dd, 4H, —CH=C$\underline{H}_2$ cis), 4.15 (m, 16H, —COO—C$\underline{H}_2$—and Ar—O—C$\underline{H}_2$—), 1.90 (m, 8H, alkoxy-C$\underline{H}_2$), 1.73 (m, 8H, alkoxy-C$\underline{H}_2$), (m, 8H, alkoxy-C$\underline{H}_2$), 1.52 (m, 16H, alkoxy-C$\underline{H}_2$).

$^{13}$C NMR (CDCl$_3$): $\delta$ (ppm): 166.26, 164.47, 164.38 (—$\underline{C}$OO—) 155.40, 153.95, 150.37, 148.61, 138.23, 131.83, 130.68, 128.52, 128.23, 126.84, 124.60, 122.12, 122.03, 121.03, 114.53, 111.92 (aromatic and —CH=CH$_2$), 69.07, 68.81 (Ar—O—$\underline{C}$H$_2$—), 64.46, 64.41 (—COO—$\underline{C}$H$_2$—) 28.99, 28.87, 28.54, 25.60 (alkoxy-$\underline{C}$H$_2$).

Thermal behavior: Cr 123 N 155 I (DSC, 2nd heating, heating rate 10 K/min, 2% by weight of sulfur).

d) Tetraacrylate 14d

Purification: Column chromatography (chloroform/ethyl acetate 40:1)

| Batch: | 3.05 g | (6.60 · 10⁻³ mol) | of 3,4-di-[6-(acryloyloxy-hexyloxy)]benzoic acid |
|---|---|---|---|
| | 5.5 ml | (0.064 mol) | of oxalyl chloride |
| | 40 ml | | of methylene chloride |
| | 1.34 g | (2.95 · 10⁻³ mol) | of 2,2'-dimethyl-4,4'-biphenylene-bis-(4-hydroxy)benzoate |
| | 1.5 ml | (0.01 mol) | of triethylamine |
| | 100 ml | | of THF |
| | 50 mg | | of 2,6-di-tert-butyl-p-cresol |

Yield: 1.66 g (42% of theory) in the form of a white solid

Characterization:

IR (KBr): $\nu$ (cm$^{-1}$): 2936, 2861, 1727, 1596, 1516, 1430, 1274, 1194, 1064, 1010, 816.

$^1$H NMR (CDCl$_3$): $\delta$ (ppm): 8.31 (d, 4H, aromatic), 7.85 (dd, 2H, aromatic), 7.67 (d, 2H, aromatic), 7.38 (d, 4H, aromatic), 7.16 (m, 6H, aromatic), 6.95 (d, 2H, aromatic), 6.40 (dd, 4H, —CH=C$\underline{H}_2$ trans), 6.12 (dd, 4H, —C$\underline{H}$=CH$_2$), 5.83 (dd, 4H, —CH=C$\underline{H}_2$ cis), 4.13 (m, 16H, —COO—C$\underline{H}_2$— and Ar—O—C$\underline{H}_2$—), 2.13 (s, 6H, aromatic), 1.91 (m, 8H, alkoxy-C$\underline{H}_2$), 1.73 (m, 8H, alkoxy-C$\underline{H}_2$), 1.50 (m, 16H, alkoxy-C$\underline{H}_2$).

$^{13}$C NMR (CDCl$_3$): $\delta$ (ppm): 166.23, 164.54, 164.38 (—$\underline{C}$OO—) 155.33, 153.94, 150.03, 148.60, 138.39, 137.73, 131.76, 130.47, 128.52, 126.95, 124.58, 122.78, 122.09, 121.04, 118.76, 114.52, 111.90 (aromatic and —CH=CH$_2$), 69.05, 68.78 (Ar—O—CH$_2$—), 64.43, 64.39 (—COO—CH$_2$—), 28.98, 28.87, 28.53, 25.64 (alkoxy-CH$_2$), 19.99 (Ar—CH$_3$).

Thermal behavior: Cr 132 N 143 I (polarization microscope)

EXAMPLE 2

Preparation of a Cholesteric Liquid Crystal Mixture

A solution consisting of 20 parts of a cholesteric mixture consisting of 93.85% by weight of the achiral tetraacrylate 14c and 6.15% by weight of the chiral compound of the formula B

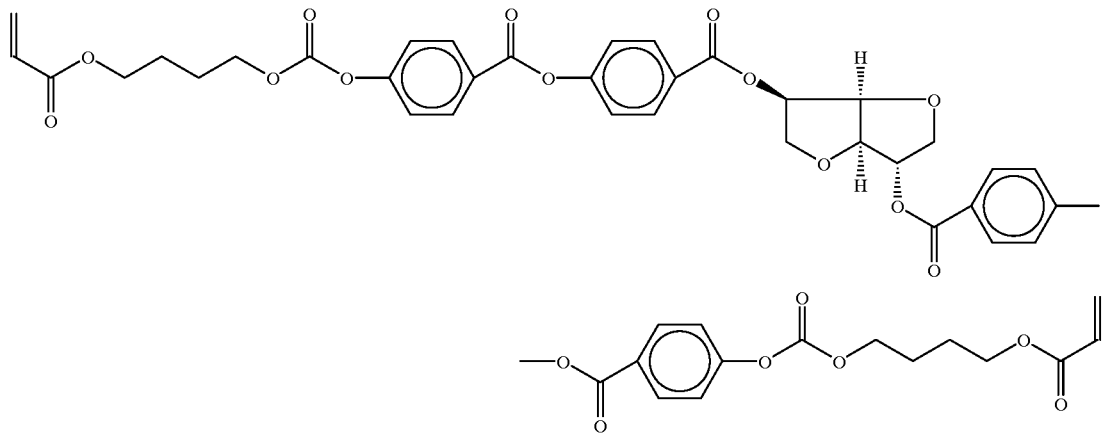

(B)

is dissolved in 77 parts of methyl ethyl ketone together with 3 parts of Irgacure 184 (1-hydroxycyclohexyl phenyl ketone) photoinitiator. The resulting mixture is applied to a 15 μM polyethylene terephthalate film using a casting apparatus, dried at 60° C. and crosslinked by irradiation with UV light, as described in WO-A-99/11733. The dry layer thickness was 2.5 μm. The layer exhibited a viewing angle-dependent color with λ$_{max}$=611 nm.

We claim:

1. A polymerizable liquid-crystalline compound of formula (I)

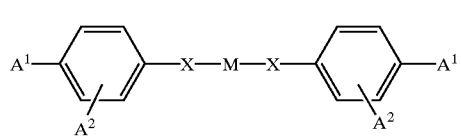

(I)

wherein

A$^1$ and A$^2$ are each independently of one another, a group of the formula

Z—X$^1$—(Sp)$_n$— wherein

Z is a crosslinkable radical;

X$^1$ —O—, —S—, —C≡N—, —O—CO—, —CO—O—, —O—CO—, —CO—NR—, —NR—CO—, —NR—, —O—CO—NR, —NR—CO—O—, —CH$_2$—O— or —NR—CO—NR, in which R is H or C$_1$-C$_4$-alkyl;

Sp is a spacer having from 1 to 30 carbon atoms, in which the carbon chain may be interrupted by either oxygen, thioether sulfur or nonadjacent imino or C$_4$-C$_1$-alkylimino groups; and n is 0 or 1;

the radicals X are identical or different and are each a single bond, —O—, —S—, —C≡N—, —O—CO—, —CO—O—, —O—CO—O—, —CO—NR—, —NR—CO—, —NR—, —O—CO—NR, —NR—CO—O—, —CH$_2$—O— or —NR—CO—NR, in which R is H or C$_1$-C$_4$-alkyl; and M is a mesogenic group.

2. The compound as claimed in claim 1, wherein A$^2$ is ortho to A$^1$ at each occurrence.

3. The compound according to claim 1, wherein Sp is:

—(CH$_2$)$_p$—,   —(CH$_2$CH$_2$O)$_m$CH$_2$CH$_2$—,
—CH$_2$CH$_2$SCH$_2$CH$_2$—,   —CH$_2$CH$_2$NHCH$_2$CH$_2$—,

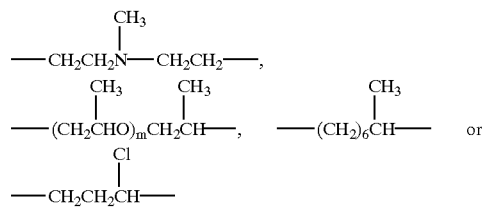

—CH$_2$CH$_2$CH— wherein m is from 1 to 3 and p is from 1 to 12.

4. The compound as claimed in claim 1, wherein Z is selected from the group consisting of

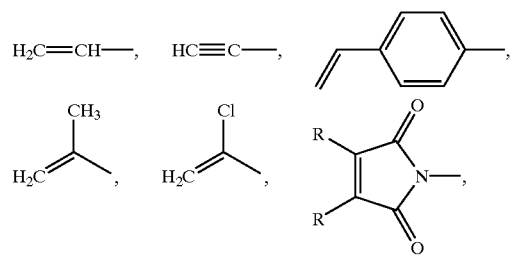

-continued

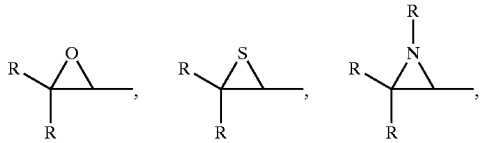

—N=C=O, —N=C=S and —O—C≡N, wherein the radicals R are each, independently of one another $C_1$–$C_4$ alkyl.

5. The compound according to claim 1, wherein M is selected from groups of the general formula II:

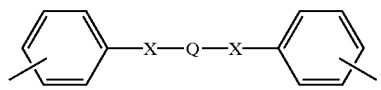
(II)

wherein

X is as defined above, and

Q is substituted or unsubstituted alkylene or a substituted or unsubstituted aromatic bridging group.

6. The compound as claimed in claim 5, wherein the aromatic bridging group is selected from the group consisting of

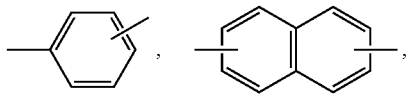

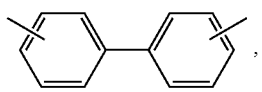

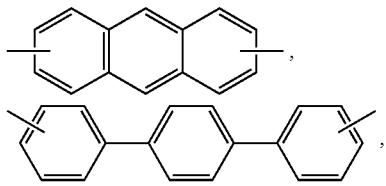

and substituted analogs thereof.

7. A process for preparing a compound as claimed in claim 1, which comprises reacting a compound of the formula III

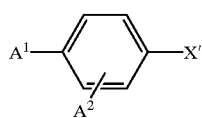
(III)

wherein $A^1$ and $A^2$ are as defined above and X' is a reactive side group, with a mesogen compound of the general formula IV $$X''{-}M{-}X'' \qquad (IV)$$

wherein M is as defined above and X" is a reactive side group, X' and X" being selected such that they are capable of forming group X.

8. The process as claimed in claim 7, wherein a mesogen of the formula IV in which X" is OH is reacted with a compound of the formula III in which X' is —COOH or —COHal, wherein Hal=F, Cl, Br or I.

9. A composition, comprising:

the compound according to claim 1, and at least one component selected from the group consisting of a cholesteric group, crosslinkable group, noncrosslinkable group, inorganic pigment, colorant, polymerizable diluent, nonpolymerizable diluent, polymerizable carrier, and nonpolymerizable carrier.

10. A coating composition, comprising:

the composition according to claim 9.

11. A pigment, comprising:

at least one compound according to claim 1 in a crosslinked form.

12. A coating composition, comprising:

the pigment according to claim 11.

13. A method for producing an optical element, comprising:

contacting the compound according to claim 1 with the optical element.

14. The method according to claim 13, wherein the optical element is a filter or polarizer.

15. A method of producing a multi-layer cholesteric special-effect pigment, comprising:

contacting the compound according to claim 1 with a multi-layer cholesteric special-effect pigment.

16. A method of producing a coating composition, comprising:

contacting the compound according to claim 1 with a coating composition.

17. A method of producing an effect film, comprising:

contacting the compound according to claim 1 with an effect film.

18. A method of producing a cosmetic composition, comprising:

contacting the compound according to claim 1 with a coating cosmetic composition.

19. A method of producing a single layer cholesteric special-effect pigment.

* * * * *